(12) United States Patent
Ishikawa

(10) Patent No.: US 11,016,953 B2
(45) Date of Patent: May 25, 2021

(54) INFORMATION PROCESSING DEVICE, METHOD, AND PROGRAM RECORDING MEDIUM

(71) Applicant: NEC Corporation, Tokyo (JP)

(72) Inventor: Kenichiro Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/339,020

(22) PCT Filed: Oct. 11, 2017

(86) PCT No.: PCT/JP2017/036765
§ 371 (c)(1),
(2) Date: Apr. 3, 2019

(87) PCT Pub. No.: WO2018/070405
PCT Pub. Date: Apr. 19, 2018

(65) Prior Publication Data
US 2019/0236055 A1    Aug. 1, 2019

(30) Foreign Application Priority Data
Oct. 12, 2016   (JP) .............................. JP2016-201023

(51) Int. Cl.
*G06F 16/21*  (2019.01)
*G06F 16/901* (2019.01)
*G06F 16/22*  (2019.01)

(52) U.S. Cl.
CPC .......... *G06F 16/21* (2019.01); *G06F 16/2246* (2019.01); *G06F 16/9027* (2019.01)

(58) Field of Classification Search
CPC ............. G06F 16/2246; G06F 16/9027; G06F 16/211; G06F 16/212; G06F 16/285; G06F 16/35; G06F 16/21; G06F 16/282
(Continued)

(56) References Cited

U.S. PATENT DOCUMENTS

2008/0215520 A1    9/2008   Gu et al.
2012/0078841 A1*   3/2012   Nakamura .............. G06F 16/23
                                                      707/618

FOREIGN PATENT DOCUMENTS

JP    2002-108850 A   4/2002
JP    2005-157859 A   6/2005
(Continued)

OTHER PUBLICATIONS

Terajima, et al., "Integrating XML Trees in Similarity Join based on Tree Serialization", DBSJ Journal, Jun. 2009, vol. 8, No. 1 (6 pages total).

(Continued)

*Primary Examiner* — Robert W Beausoliel, Jr.
*Assistant Examiner* — Pedro J Santos

(57) ABSTRACT

An information processing device includes acquisition means for acquiring a plurality of tree structure data in which information groups are represented by tree structures and merge means for generating merged tree structure data merging the plurality of tree structure data. The merge means merges, for information satisfying a condition indicating that a certain distance from other information in the tree structure data is maintained, a subtree at a level below the information in the tree structure data, into the merged tree structure data, wherein the information satisfying the condition is included in a node selected from the plurality of tree structure data; and reorganizing for information satisfying a condition indicating that the distance between pieces of information is short, a merged subtree by merging subtrees below the information in the tree structure data into the information.

15 Claims, 36 Drawing Sheets

(58) Field of Classification Search
USPC .............................. 707/737, 797, 755, 756
See application file for complete search history.

(56) References Cited

FOREIGN PATENT DOCUMENTS

| | | |
|---|---|---|
| JP | 2007-52556 A | 3/2007 |
| WO | 2014/109127 A1 | 7/2014 |

OTHER PUBLICATIONS

International Search Report in International Application No. PCT/JP2017/036765, dated Jan. 9, 2018.
Written Opinion in International Application No. PCT/JP2017/036765, dated Jan. 9, 2018.

* cited by examiner

INFORMATION PROCESSING DEVICE, METHOD, AND PROGRAM RECORDING MEDIUM

This application is a National Stage Entry of PCT/JP2017/036765 filed on Oct. 11, 2017, which claims priority from Japanese Patent Application 2016-201023 filed on Oct. 12, 2016, the contents of all of which are incorporated herein by reference, in their entirety.

TECHNICAL FIELD

The present invention relates to a technology of processing an information group represented by a tree structure.

BACKGROUND ART

Information groups may be represented by a tree structure. Consequently, a rapid information retrieval, rapid extraction of an information group having a certain feature, and the like can be performed. For example, when using an evaluation function evaluating proximity in distance between two pieces of information, an information group can be represented by a tree structure by connecting pieces of information having a distance between which is less than a threshold value, with a branch. In such the tree structure, information groups included at the same level are called a node. In particular, a node at a root, that is, at the highest level, in a tree structure is called a root node.

The root node in a tree structure includes an information group being a representative of the tree structure. Pieces of the information in the information groups mutually satisfy a condition indicating that a certain distance between the pieces of information is maintained. Each pieces of the information included in the root node may be connected to a child node. In the tree structure, a child node is located at a level below the root node. A level above a child node is called a parent node.

A child node is an information group satisfying a condition indicating that a certain distance from the information group to connected information (parent node) is short. Information included in a child node may be further connected to a child node. A child node connected to a child node may be called a grandchild node.

A distance between pieces of information included in the same node becomes shorter as the node gets closer to an end node of a tree structure. Accordingly, by tracing child nodes including information to be retrieved one by one from the root node of a tree structure, information a distance from which to the information to be retrieved is short (that is, similar) can be rapidly retrieved.

PTL 1 describes an example of a related art of processing an information group represented by such a tree structure. The related art provides a rapid retrieval by representing an information group by tree structures based on a similarity between pieces of information.

CITATION LIST

Patent Literature

[PTL 1] International Application Publication No. WO 2014/109127

SUMMARY OF INVENTION

Technical Problem

When a plurality of tree structures exist, there is a need for merging the plurality of tree structures. For example, when a tree structure composed of an information group acquired in one day exists, there is a need for combining a plurality of tree structures including information groups acquired in one day, in order to acquire one tree structure including an information group acquired in several days. Further, there is a need for combining a plurality of tree structures generated by different organizations into one tree structure. Further, there is a need for combining a plurality of tree structures individually generated in a plurality of environments mutual communication between which is difficult into one tree structure.

However, PTL 1 does not describe a technology related to such merger of tree structures.

As a technique of merging a plurality of tree structures, a technique of inserting each piece of information in a tree structure including less pieces of information into a tree structure including more pieces of information is generally considered. However, the technique has a problem that an order of processing costs becomes around [a number of pieces of information in a tree structure including less pieces of information]×log [a number of pieces of information in a tree structure including more pieces of information], and therefore processing takes time.

The present invention is made in order to solve the problem described above. Specifically, an object of the present invention is to provide a technology of more rapidly merging a plurality of tree structures representing information groups, based on a distance between pieces of information, into one tree structure.

Solution to Problem

One of invention is an information processing device. The information processing device includes acquisition means and merge means.

The acquisition means acquires a plurality of tree structure data in which information groups are represented by tree structures based on a distance between pieces of information. Each of the plurality of tree structure data is configured such that a distance between pieces of information included in a child node connected to a parent node is shorter than a distance between pieces of information included in the parent node, and also a distance between pieces of information included in a node becomes shorter as the node gets closer to an end node of the tree structure.

The merge means generates merged tree structure data merging the plurality of tree structure data acquired. The merge means is configured to perform, for information satisfying a condition indicating that a certain distance from other information in the tree structure data is maintained, merging a subtree at a level below the information in the tree structure data, into the merged tree structure data. The information satisfying the condition is included in a node selected from the plurality of pieces of tree structure data. And the merge means reorganizes, for information satisfying a condition indicating that the distance between pieces of information is short, a merged subtree by merging subtrees below the information in the tree structure data into the information.

Another one of invention is a method by a computer device. The method includes acquiring a plurality of tree structure data in which information groups are represented by tree structures based on a distance between pieces of information, each of the plurality of tree structure data being configured such that a distance between pieces of information included in a child node connected to a parent node is shorter than a distance between pieces of information included in the parent node, and also a distance between pieces of information included in a node becomes shorter as the node gets closer to an end node of the tree structure. The method includes generating merged tree structure data merging the plurality of tree structure data acquired. The generating the merged tree structure data includes, for information satisfying a condition indicating that a certain distance from other information in the tree structure data is maintained, merging a subtree at a level below the information in the tree structure data, into the merged tree structure data. The information satisfying the condition is included in a node selected from the plurality of pieces of tree structure data. And the method includes reorganizing, for information satisfying a condition indicating that the distance between pieces of information is short, a merged subtree by merging subtrees below the information in the tree structure data into the information.

Another one of the invention is a program recording medium. The program recording medium has a program recorded thereon. The program causes a computer device to execute acquiring a plurality of tree structure data in which information groups are represented by tree structures based on a distance between pieces of information. Each of the plurality of tree structure data is configured such that a distance between pieces of information included in a child node connected to information included in a parent node is shorter than a distance between pieces of information included in the parent node, and also a distance between pieces of information included in a node becomes shorter as the node gets closer to an end node of the tree structure. And the program further causes the computer device to execute, in order to generate merged tree structure data merging the plurality of tree structure data, for information satisfying a condition indicating that a certain distance from other information is maintained in a plurality of pieces of information including information included in a node selected in each of the plurality of tree structure data, merging a subtree at a level below the information in the tree structure data into the information, into the merged tree structure data. And the program further causes the computer device to execute, with respect to a plurality of pieces of information mutually satisfying a condition indicating that the distance between pieces of information is short, reorganizing a subtree reorganizing a subtree below each piece of information in the tree structure data into the information such that the subtree is merged into the merged tree structure data.

Advantageous Effects of Invention

The present invention can provide a technology of more rapidly merging a plurality of tree structures representing information groups, based on a distance between pieces of information, into one tree structure.

EXAMPLE EMBODIMENT

Example embodiments of the present invention will be described in detail below with reference to drawings.

First Example Embodiment

Figure 1:
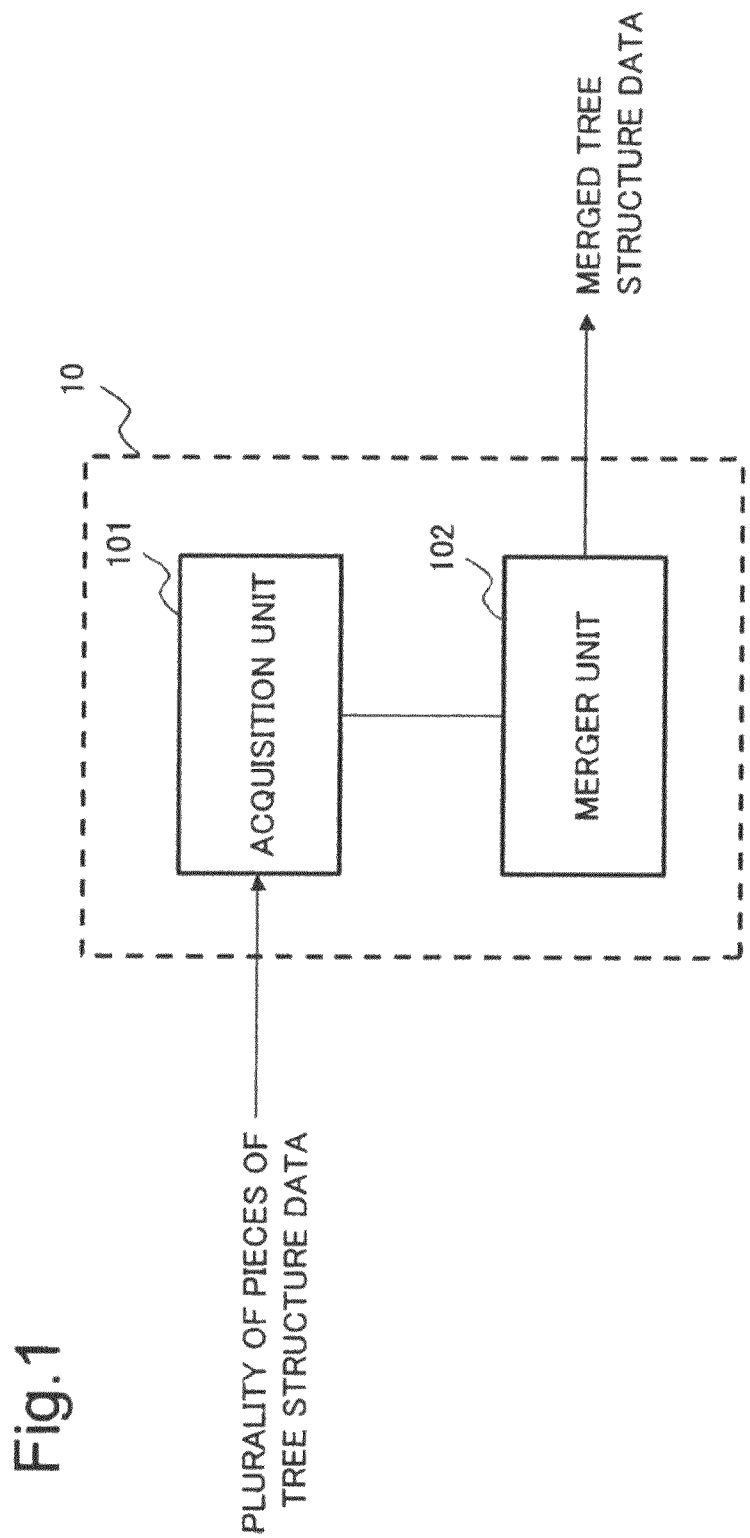
FIG. 1 is a diagram illustrating a functional block configuration of an information processing device according to a first example embodiment of the present invention.

FIG. 1 illustrates a functional block configuration of an information processing device 10 according to a first example embodiment of the present invention. In FIG. 1, the information processing device 10 includes an acquisition unit 101 and a merger unit 102.

Figure 2:
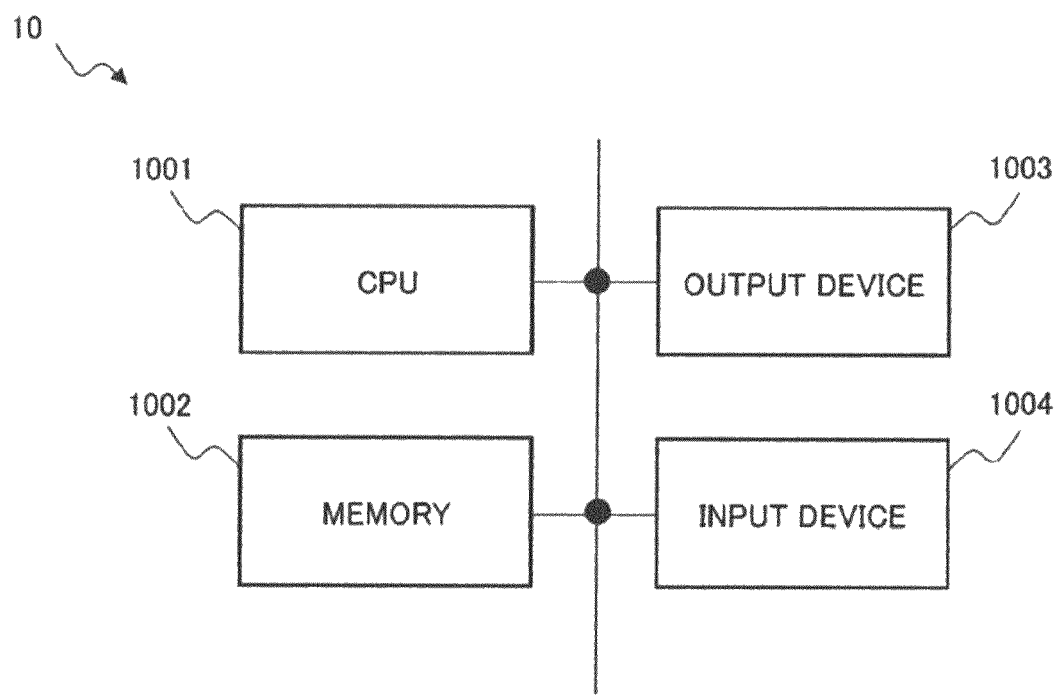
FIG. 2 is a diagram illustrating an example of a hardware configuration of the information processing device according to the first example embodiment of the present invention.

The information processing device 10 can be configured with hardware components as illustrated in FIG. 2. In FIG. 2, the information processing device 10 includes a central processing unit (CPU) 1001, a memory 1002, an output device 1003, and an input device 1004.

The memory 1002 is configured with a random access memory (RAM), a read only memory (ROM), an auxiliary storage device (such as a hard disk), and the like. The output device 1003 is configured with a device outputting information, such as a display device or a printer. The input device 1004 is configured with a device receiving input of a user operation, such as a keyboard or a mouse.

In this case, each functional block in the information processing device 10 is configured with the CPU 1001 reading and executing a computer program stored in the memory 1002 and also controlling the respective other units. The hardware configuration of the information processing device 10 and the respective functional blocks thereof is not limited to the configuration described above.

Next, target tree structure data in the present example embodiment will be described. Tree structure data are data representing an information group by tree structures based on a distance between pieces of information. For example, a distance between pieces of information can be represented by an output value of an evaluation function evaluating the distance between the pieces of information.

In tree structure data, a child node is connected to information included in a parent node. A distance between pieces of information included in a child node is shorter than a distance between pieces of information included in a parent node. In other words, tree structure data are configured such that a distance between pieces of information included in a node becomes shorter as the node gets closer to an end node of the tree structure.

Next, details of each functional block will be described.

The acquisition unit 101 acquires a plurality of tree structure data. For example, the acquisition unit 101 may acquire a plurality of tree structure data through the input device 1004. Further, the acquisition unit 101 may acquire a plurality of tree structure data from the memory 1002. Further, the acquisition unit 101 may acquire a plurality of tree structure data through a network interface or a portable storage medium (unillustrated).

The merger unit 102 merges a plurality of tree structure data.

Specifically, the merger unit 102 acquires a node in merged tree structure data by selecting a node from each of a plurality of tree structure data, acquiring information included in the selected node, and merging the acquired information.

For example, a node selected by the merger unit 102 from a plurality of tree structure data may be the root node or may be the root node of a subtree. However, the selected node is not limited to the above.

Further, the merger unit 102 specifies one or more pieces of information satisfying a condition indicating that a certain distance from each piece of other information is maintained in the plurality of pieces of information acquired as described above, from the node selected from each of the plurality of tree structure data.

Then, with respect to the thus specified one or more pieces of information, the merger unit 102 includes, merging a subtree at a level below the information in tree structure data originally including the information into the merged tree structure data. "A subtree below certain information" in a tree structure refers to a subtree having the information as a root, that is, a tree structure composed of a child node branching from the information and every node at a level below the child node.

Further, the merger unit 102 specifies a plurality of pieces of information mutually satisfying a condition indicating that a distance between pieces of information is short, in the plurality of pieces of information acquired as described above from the node selected from each of the plurality of tree structure data. Then, with respect to the thus specified plurality of pieces of information, the merger unit 102 reorganizes subtrees below each piece of information in tree structure data originally including the information into one tree structure, by merging the subtrees. Then, the merger unit 102 includes the reorganized tree structure into merged tree structure data as a subtree.

Figure 3:
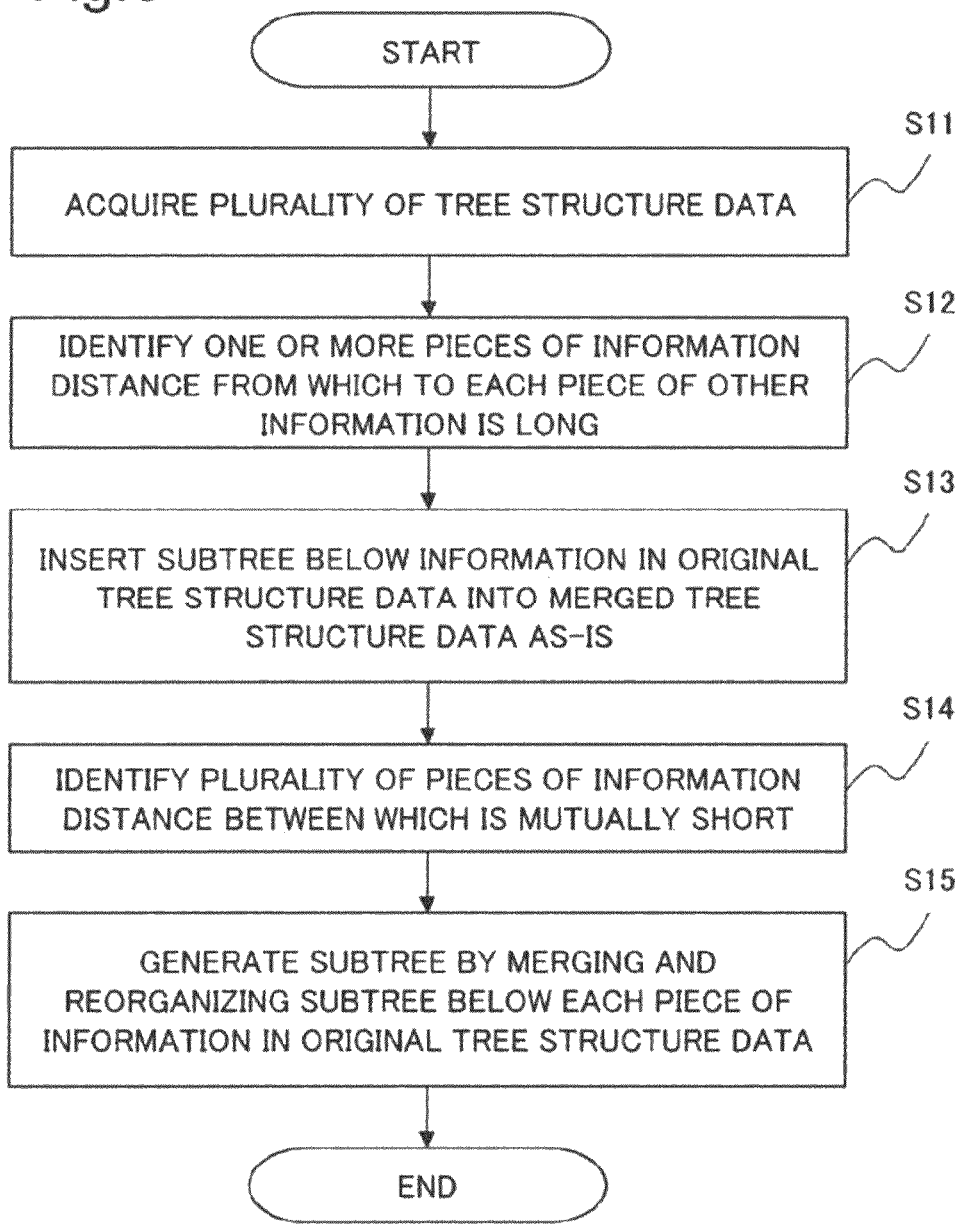
FIG. 3 is a flowchart illustrating an operation of the information processing device according to the first example embodiment of the present invention.

An operation of the information processing device 10 configured as described above will be described with reference to FIG. 3.

First, the acquisition unit 101 acquires a plurality of pieces of (original) tree structure data to be merged (Step S11).

Next, the merger unit 102 specifies one or more pieces of information satisfying a condition indicating that a certain distance from which to each piece of other information is maintained, in a plurality of pieces of information included in a node selected from each of the plurality of tree structure data (Step S12).

Next, with respect to each piece of information specified in Step S12, the merger unit 102 includes, merging a subtree at a level below the information in the tree structure data originally including the information into merged tree structure data (Step S13).

For example, when more than one pieces of information specified in Step S12 exist, the merger unit 102 may include the pieces of information into the same node in the merged tree structure data. Then, the merger unit 102 may connect each subtree in the tree structure data to a level below the information.

Next, the merger unit 102 specifies a plurality of pieces of information mutually satisfying a condition indicating that a distance between pieces of information is short, in the plurality of pieces of information acquired as described above from the node selected in each of the plurality of tree structure data (Step S14).

Subsequently, with respect to each of the plurality of information specified in Step S14, the merger unit 102 reorganizes subtrees below the information in the tree structure data originally including the information into one tree structure by merging the subtrees (Step S15).

Then, the merger unit 102 inserts the reorganized tree structure into the merged tree structure data as a subtree (Step S16).

For example, the merger unit 102 may integrate the root node of the reorganized tree structure into a node in which the information specified in Step S12 is arranged, in the merged tree structure data.

Then, the information processing device 10 ends the operation.

Next, an effect of the first example embodiment of the present invention will be described.

The first example embodiment of the present invention can more rapidly merge a plurality of tree structures representing information groups, based on a distance between pieces of information, into one tree structure.

The reason will be described. According to the present example embodiment, the acquisition unit 101 acquires a plurality of tree structure data in which information groups are represented by tree structures. In each piece of tree structure data, a distance between pieces of information included in a child node is shorter than a distance between pieces of information included in a parent node. Accordingly, a distance between pieces of information included in a node becomes shorter as the node gets closer to an end node of the tree structure.

Then, the merger unit 102 specifies information satisfying a condition (for example, an output value of an evaluation function is greater than or equal to a threshold value) indicating that a certain distance from each piece of other information is maintained, in a plurality of pieces of information composed of information included in a node selected in each of a plurality of tree structure data. Then, with respect to the thus specified information, the merger unit 102 includes, merging a subtree at a level below the information in tree structure data originally including the information into merged tree structure data. Further, the merger unit 102 specifies a plurality of pieces of information mutually satisfying a condition (for example, an output value of an evaluation function is less than a threshold value) indicating that a distance between pieces of information is short, in the plurality of pieces of information composed of the information included in the node selected in each of the plurality of tree structure data.

Then, with respect to the thus specified information, the merger unit 102 generates a subtree reorganizing subtrees below each piece of the information in the tree structure data originally including the information such that the subtrees are merged and are represented by a tree structure. Then, the merger unit 102 includes the reorganized subtree into merged tree structure data.

In tree structure data, a subtree having certain information as a root is composed of information a distance from which to the information is short (that is, similar). On the other hand, pieces of information respectively included in subtrees having two pieces of information a distance between which is long (that is, not similar) as roots are expected to be distant in distance.

Accordingly, in original tree structure data, subtrees below pieces of information a distance between which is long are considered not likely to affect a structure of merged tree structure data even when the subtrees are not merged into one subtree, that is, when the subtrees are applied to the merged tree structure data as separate subtrees.

With respect to subtrees below pieces of information mutually close in distance, the subtrees are reorganized into one tree structure by merging the subtrees, according to the present example embodiment. On the other hand, with respect to subtrees below pieces of information distant in distance, the subtrees are not reorganized into one tree structure. Accordingly, processing costs required for evaluation of a distance between pieces of information and reorganization of a tree structure are greatly reduced.

Second Example Embodiment

Next, a second example embodiment of the present invention will be described in detail with reference to drawings. In each drawing referred to in the description of the present example embodiment, a configuration identical to and a step operating similarly to those according to the first example embodiment of the present invention are respectively given reference signs identical to those in the first example embodiment, and detailed description thereof in the present example embodiment is omitted.

Figure 4:
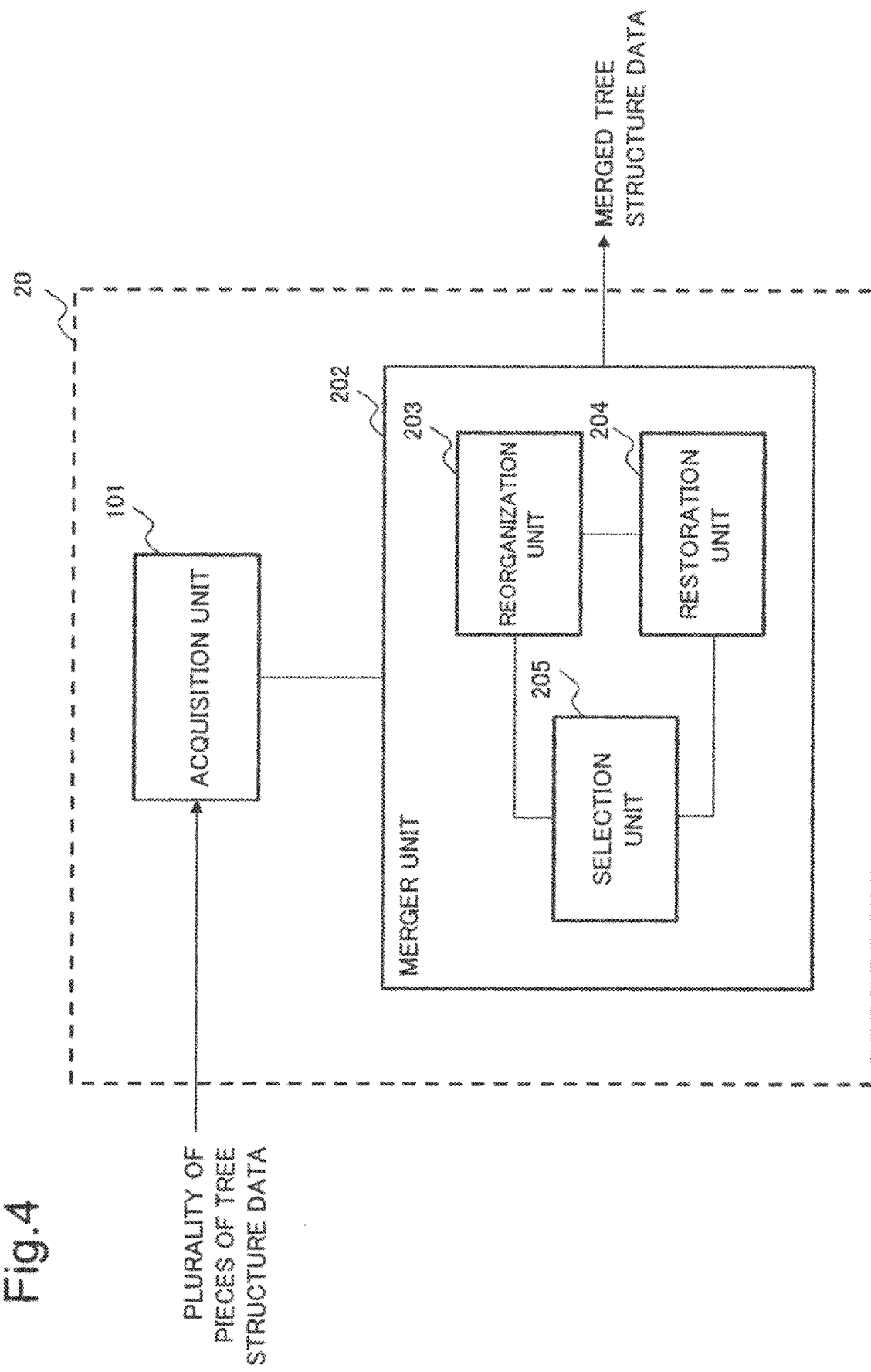
FIG. 4 is a diagram illustrating a functional block configuration of an information processing device according to a second example embodiment of the present invention.

First, FIG. 4 illustrates a functional block configuration of an information processing device 20 according to the second example embodiment of the present invention. In FIG. 4, the information processing device 20 differs from the information processing device 10 according to the first example embodiment of the present invention in including a merger unit 202 in place of the merger unit 102. The merger unit 202 includes a reorganization unit 203, a restoration unit 204, and a selection unit 205.

The information processing device 20 and the respective functional blocks thereof can be configured with hardware components similar to those according to the first example embodiment of the present invention described with reference to FIG. 2. However, the hardware configuration of the information processing device 20 and the respective functional blocks thereof is not limited to the configuration described above.

Target tree structure data in the present example embodiment will be described. Proximity in distance between pieces of information in tree structure data is evaluated by an evaluation function, according to the present example embodiment.

An evaluation function is a function for evaluating proximity in distance between two pieces of information. It is assumed that an evaluation result has correlation. For example, it is assumed that an evaluation result (that is, an output value of an evaluation function) indicating proximity in distance between information A and information B is greater than or equal to a predetermined threshold value, and also an evaluation result indicating proximity in distance between the information A and information C is greater than or equal to the predetermined threshold value. In this case, an evaluation result indicating proximity in distance between the information B and the information C is also greater than or equal to the threshold value.

An output value of an evaluation function satisfying a predetermined condition (for example, being greater than or equal to a threshold value) is hereinafter also described as being evaluated to be high. Further, an output value of an evaluation function not satisfying a predetermined condition (for example, being less than a threshold value) is also described as being evaluated to be low. Further, an output value of an evaluation function is also described as an evaluation result or an evaluation height.

For example, it is assumed that information constituting tree structure data is a sentence. In this case, an evaluation function may output a degree of similarity between styles of two sentences as an evaluation result. For example, a degree of similarity may be a numerical value indicating a degree of matching between feature values of styles of two sentences.

Further, for example, it is assumed that information constituting tree structure data is an image. In this case, an evaluation function may output a degree of similarity between impressions received by a person from two images as an evaluation result. Further, for example, it is assumed that information constituting a tree structure is a facial image. In this case, an evaluation function may output a degree of similarity indicating a likelihood of two facial images being related to the same person as an evaluation result. A type of information constituting a tree structure and an evaluation function are not limited to the examples described above.

By use of such an evaluation function, tree structure data according to the present example embodiment are configured in accordance with the following rules.

1. A plurality of pieces of information mutually evaluated to be low (an output value of the evaluation function does not satisfy a predetermined condition described above) are put in the root node.
2. An information group evaluated to be high (that is, a distance from the information is short) is connected to information included in the root node, as a child node.
3. An evaluation height of an information group included in a child node is greater than or equal to an evaluation height of an information group included in a parent node.
4. An evaluation of an information group included in a child node becomes higher as the child node gets closer to an end of a tree structure.

For example, it is assumed that tree structure data configured in accordance with the rules include different pieces of information A and B in a certain node. At this time, it is anticipated that proximity in distance between information included in a child node of the information A and information included in a child node of the information B is not closer compared with proximity in distance between pieces of information included in the child node of the information A and proximity in distance between pieces of information included in the child node of the information B. This trend becomes stronger as the child node gets closer to the root node.

Figure 5:
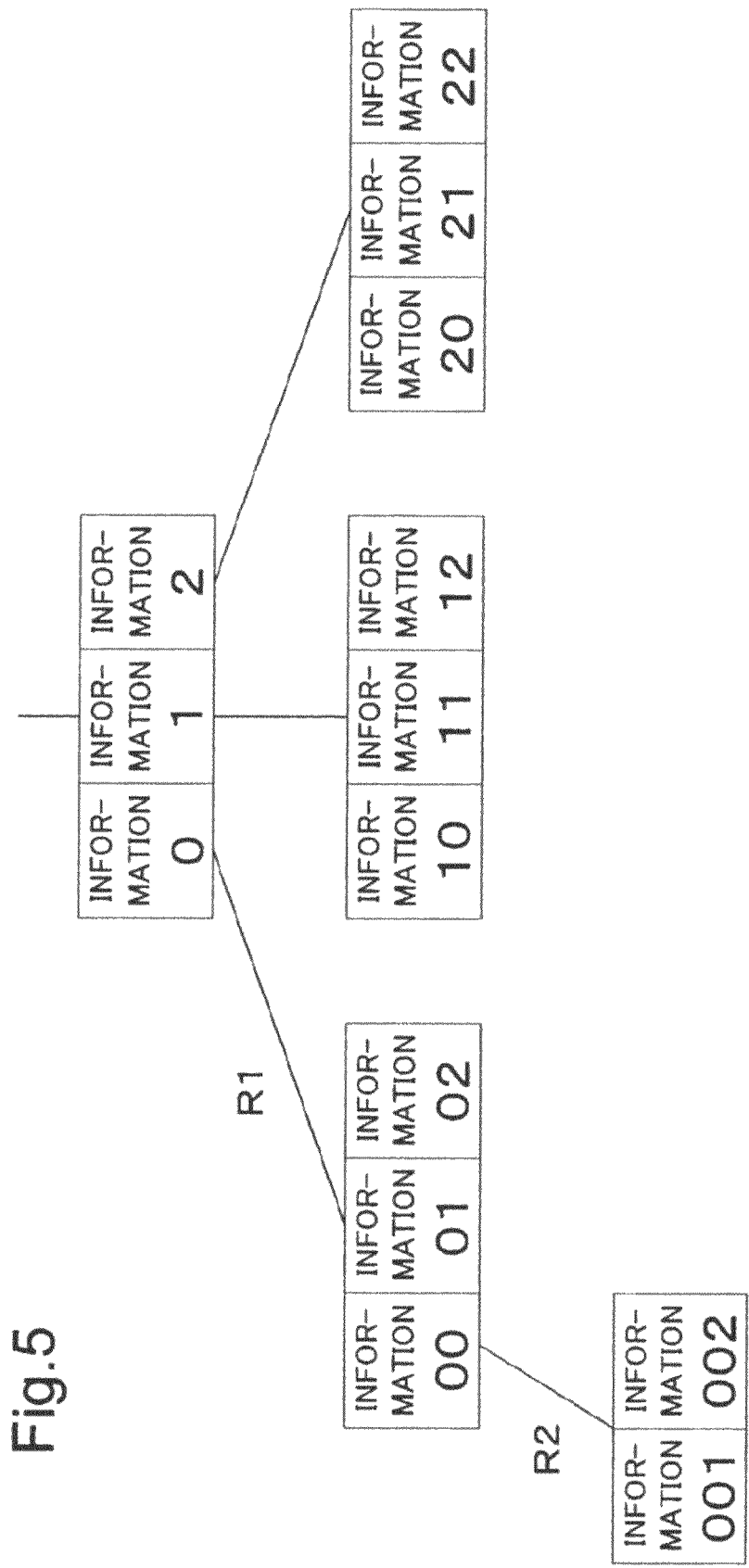
FIG. 5 is a diagram illustrating an example of target tree structure data according to the second example embodiment of the present invention.

FIG. 5 illustrates an example of such tree structure data. In FIG. 5, the root node includes information 0, information 1, and information 2. Each of mutual evaluation heights between the information 0, the information 1, and the information 2 may be less than R1.

Further, a child node connected to the information 0 includes information 00, information 01, and information 02. Each of evaluation heights between the information 0, and the information 00, the information 01, and the information 02 is greater than or equal to R1. Further, each of mutual evaluation heights between the information 00, the information 01, and the information 02 is less than R2.

Further, a child node connected to the information 00 includes information 001 and information 002. Each of evaluation heights between the information 00, and the information 001 and the information 002 is greater than or equal to R2. Note that R2 has a value greater than R1.

Next, each functional block included in the merger unit 202 will be described.

The reorganization unit 203 evaluates information included in each node of interest by an evaluation function and generates a merged subtree composed of information included in the node of interest, based on an evaluation result between the pieces of information (an output value of the evaluation function, indicating proximity in distance between pieces of information). A merged subtree is constructed in accordance with the aforementioned rules 1 to 4 with respect to a plurality of pieces of applicable information. Information including a child node in a merged subtree is herein described as first information. Further, information not including a child node is described as second information. Details of a node of interest will be described later.

Further, the reorganization unit 203 inserts a merged subtree into "a position based on a node of interest" in merged tree structure data. A position based on a node of interest will be described below.

For example, it is assumed that a node of interest is the root node of original tree structure data. In this case, a position based on the node of interest refers to a position of the root node in the merged tree structure data.

Further, for example, it is assumed that one of nodes of interest is a child node of first information in a merged subtree generated by preceding repetition processing to be described later. A merged subtree generated by preceding repetition processing is hereinafter also simply described as a preceding merged subtree. In this case, a position based on the node of interest refers to a position of the child node determined to be one of the nodes of interest in the preceding merged subtree inserted into merged tree structure data.

The restoration unit 204 restores a tree structure below second information in merged tree structure data by connecting a subtree including a child node and below connected to the second information in original tree structure data including the second information to the second information in a merged subtree.

The selection unit 205 first selects the root nodes of a plurality of tree structure data as nodes of interest. Subsequently, the selection unit 205 selects, as new nodes of interest, a child node connected to first information in a preceding merged subtree and a child node connected to the first information in tree structure data originally including the first information.

Thereafter, the selection unit 205 selects a new node of interest, and the reorganization unit 203 and the restoration unit 204 repeat reorganization and restoration of original tree structure data, based on the selected node of interest. The processing is hereinafter referred to as repetition processing.

The merger unit 202 may acquire information indicating a characteristic applied to merged tree structure data, prior to causing the respective functional blocks to function. For example, information indicating a characteristic includes a maximum number of pieces of information held by a node but is not limited thereto.

The merger unit 202 may acquire information indicating a characteristic through the input device 1004. Further, the merger unit 202 may acquire information indicating a characteristic from the memory 1002. Further, the merger unit 202 may acquire information indicating a characteristic of a plurality of tree structure data acquired by the acquisition unit 101 as information indicating a characteristic applied to merged tree structure data.

An operation of the information processing device 20 configured as described above will be described with reference to FIG. 6.

Figure 6:
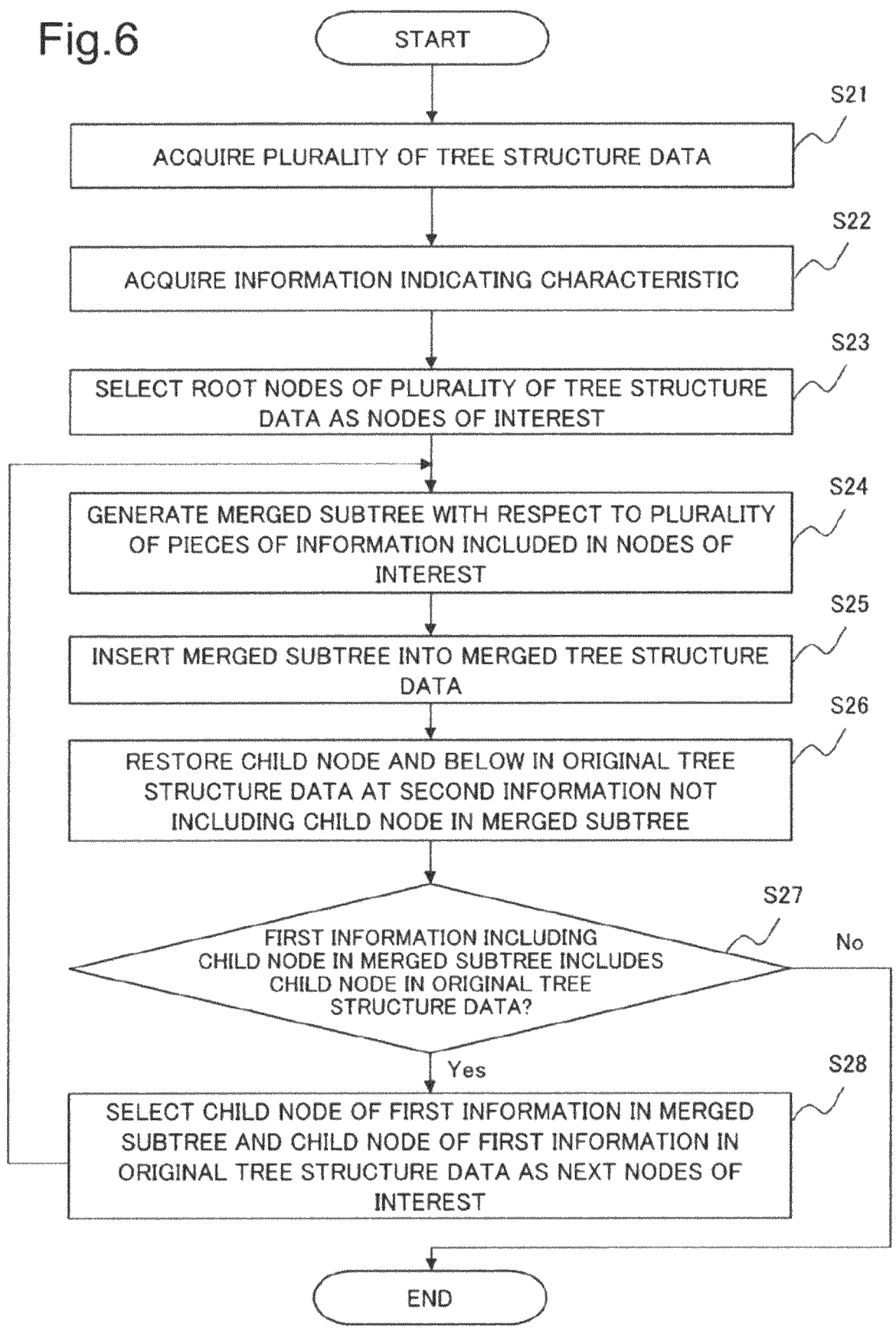
FIG. 6 is a flowchart illustrating an operation of the information processing device according to the second example embodiment of the present invention.

In FIG. 6, first, the merger unit 202 acquires a plurality of tree structure data (Step S21).

Next, the merger unit 202 acquires information indicating a characteristic applied to merged tree structure data (Step S22).

Next, the selection unit 205 selects the root node of each of the plurality of tree structure data as a node of interest (Step S23).

Next, with respect to a plurality of pieces of information included in the node of interest, the reorganization unit 203 generates a merged subtree, based on an evaluation result between the pieces of information (Step S24).

As described above, information including a child node is described as first information, and information not including a child node is described as second information.

It is conceivable that a structure of a merged subtree to be generated may vary depending on an order of insertion of a plurality of pieces of target information into a merged subtree. It is assumed here that an order of insertion of a plurality of pieces of information into a merged subtree is random. However, the order of insertion of a plurality of pieces of information into a merged subtree may be an order based on another criterion.

Next, the reorganization unit 203 inserts the merged subtree into a position based on the node of interest in merged tree structure data (Step S25).

Next, the restoration unit 204 restores a child node and below connected to second information in tree structure data originally including the second information by connecting the child node and below to the second information in the merged subtree (Step S26).

At this time, in a case that second information does not include a child node in tree structure data originally including the second information, the restoration unit 204 does not restore a child node and below with respect to the second information even when the second information is in the merged subtree.

Next, the selection unit 205 determines whether or not first information in the merged subtree, the first information including a child node in tree structure data originally including the first information, exists (Step S27).

A case when such first information exists will be described (Yes in Step S27). In this case, the selection unit 205 selects the child node connected to the first information in the merged subtree and a child node connected to the first information in the tree structure data originally including the first information, as new nodes of interest (Step S28).

Then, the information processing device 20 repeats the processing from Step S24 with respect to the new nodes of interest selected in Step S28.

When a plurality of pieces of applicable first information exist in Step S27, the information processing device 20 executes Step S28 and repetition of the processing from Step S24 with respect to each piece of the first information.

Further, when applicable first information does not exist in Step S27, the information processing device 20 ends the operation.

Next, an operation of the information processing device 20 will be presented by a specific example. It is assumed in this specific example that the information processing device 20 merges two tree structure data a and b, and generates merged tree structure data c.

Figure 7:
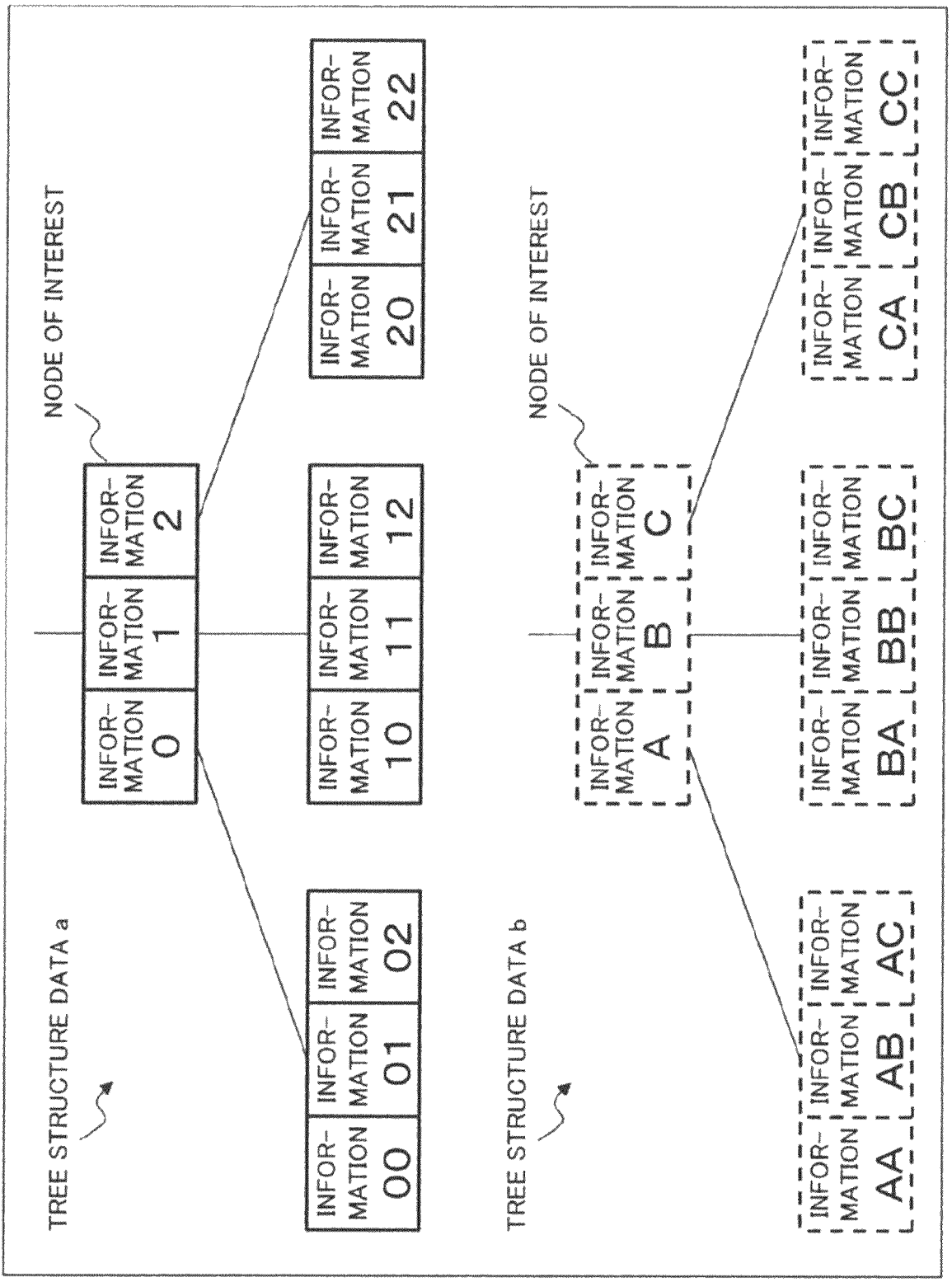
FIG. 7 is a diagram illustrating two tree structure data to be merged in a specific example of the second example embodiment of the present invention.

First, it is assumed that the acquisition unit 101 acquires the tree structure data a and the tree structure data b illustrated in FIG. 7 (Step S21).

In FIG. 7, information included in each node in the tree structure data a is represented by a solid rectangle. Further, information included in each node in the tree structure data b is represented by a dotted rectangle. In the tree structure data a, the root node includes information 0, information 1, and information 2. Further, in the tree structure data b, the root node includes information A, information B, and information C. In FIG. 7, information with an identifier "X" is denoted as information X. A numeral or an alphabetical letter is applied to "X." Further, an identifier of information included in a child node of information X is denoted as "XY." Information included in a child node of information X is denoted as information XY. A numeral or an alphabetical letter is applied to "Y."

For example, in FIG. 7, a child node of the information 0 included in the root node of the tree structure data a includes information 00, information 01, and information 02. Further, a child node of the information A included in the root node of the tree structure data b includes information AA, information AB, and information AC.

Figure 8:
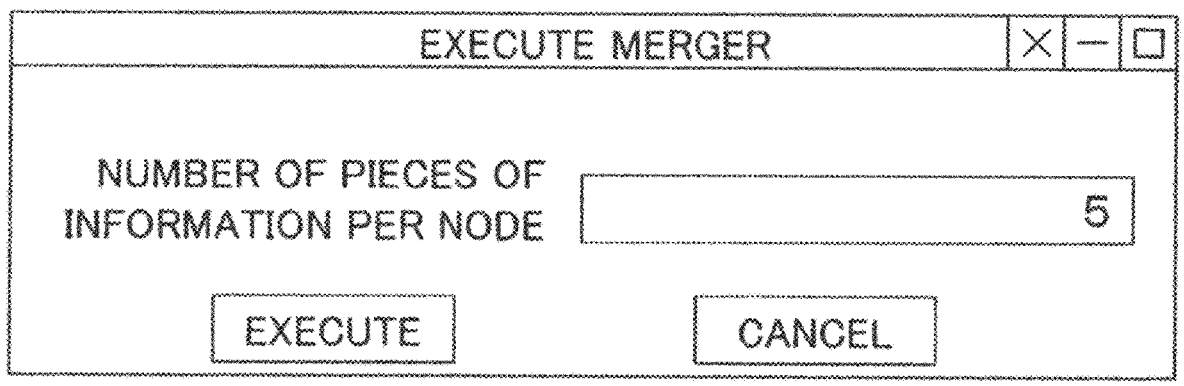
FIG. 8 is a diagram illustrating an example of a screen for acquiring information indicating a characteristic to be applied to merged tree structure data in the specific example of the second example embodiment of the present invention.

Next, the merger unit 202 acquires a maximum number of pieces of information included in a node, as information indicating a characteristic applied to merged tree structure data. It is assumed in this specific example that the merger unit 202 outputs a user interface screen as illustrated in FIG. 8 to the output device 1003 and acquires information indicating a maximum number 5 through the input device 1004 (Step S22).

Next, the selection unit 205 selects the root node of the tree structure data a and the root node of the tree structure data b as nodes of interest (Step S23).

Next, with respect to a plurality of pieces of information composed of information included in the node of interest, the reorganization unit 203 generates a merged subtree c1, based on an evaluation result between the pieces of information (Step S24).

In this case, the root node of the tree structure data a and the root node of the tree structure data b being the nodes of interest include the information 0, the information 1, the information 2, the information A, the information B, and the information C. Then the reorganization unit 203 inserts the plurality of pieces of information into the new merged subtree c1 in a random order. For example, information selected first is put in the root node of the merged subtree c1.

Further, when information evaluated to be high (for example, an output value of an evaluation function is greater than or equal to a threshold value) with respect to information selected next exists in information already put in the root node of the merged subtree c1, the information selected next is put in a child node of the information. Further, when the selected information is evaluated to be low (for example, an output value of an evaluation function is less than a threshold value) with respect to every piece of information already put in the root node of the merged subtree c1, the selected information is put in the root node.

Figure 9:
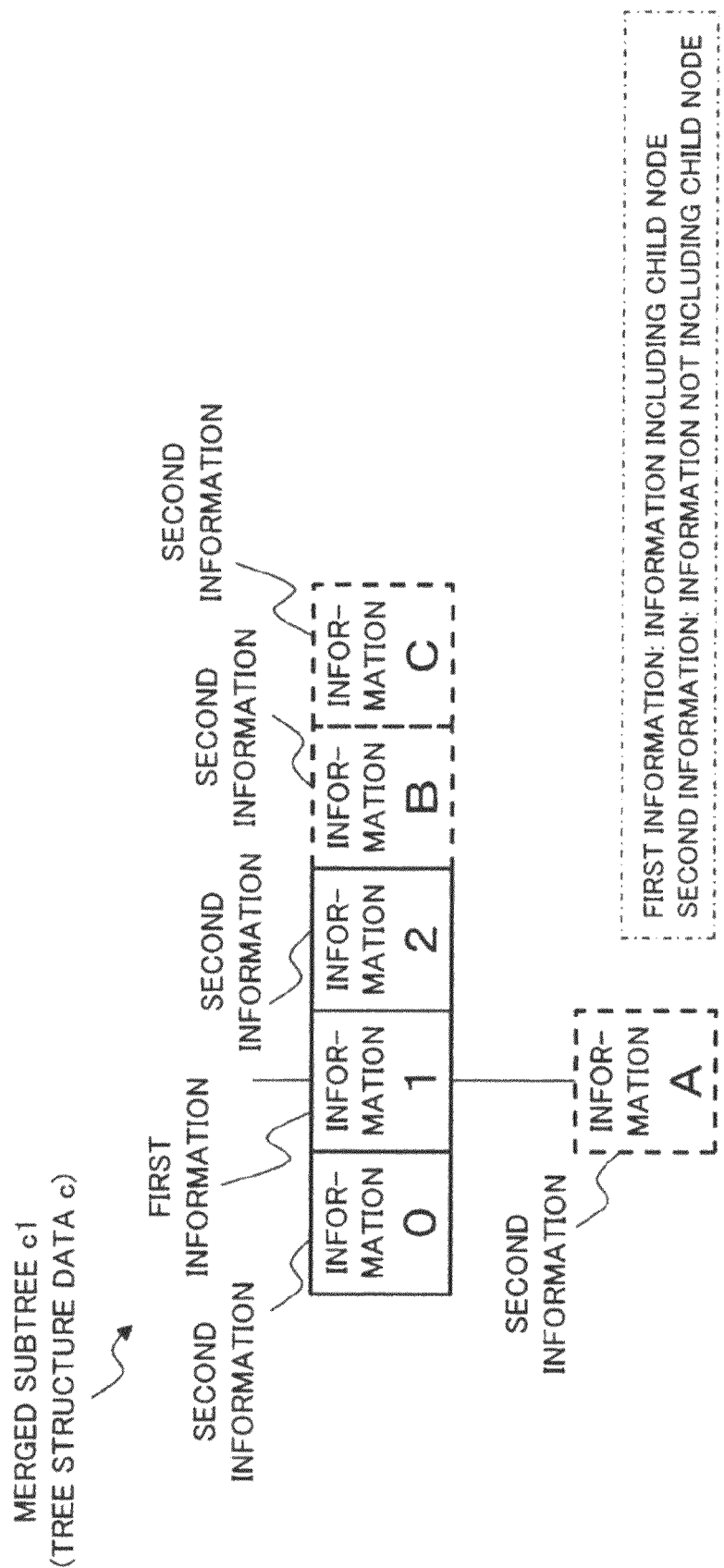
FIG. 9 is a diagram illustrating a merged subtree generated in the specific example of the second example embodiment of the present invention.

It is assumed that a merged subtree c1 illustrated in FIG. 9 is thus generated. In FIG. 9, the information 0, the information 1, the information 2, the information B, and the information C are arranged in the root node of the merged subtree c1, and the information A is arranged in a child node of the information 1. In FIG. 9, the information 1 is first information including a child node. Further, each piece of the information 0, the information 2, the information A, the information B, and the information C is second information not including a child node.

Then, the reorganization unit 203 inserts the merged subtree c1 illustrated in FIG. 9 into a position based on the node of interest in the tree structure data c (Step S25).

In this case, the nodes of interest are root nodes of the tree structure data a and the tree structure data b, and therefore the position based on the node of interest is a position of the root node of the tree structure data c. In other words, the merged subtree c1 illustrated in FIG. 9 becomes the tree structure data c as-is.

Next, the restoration unit 204 connects, to each piece of second information in FIG. 9, a child node and below connected to the second information in the tree structure data a or the tree structure data b (Step S26).

As illustrated above, pieces of second information not including a child node in FIG. 9 are the information 0, the information 2, the information A, the information B, and the information C. Further, for example, a child node connected to the information 0 in the tree structure data a originally including the information 0 includes the information 00, the information 01, and the information 02. Accordingly, the restoration unit 204 connects the child node including the information 00, the information 01, and the information 02 below the information 0 in FIG. 9.

Figure 10:
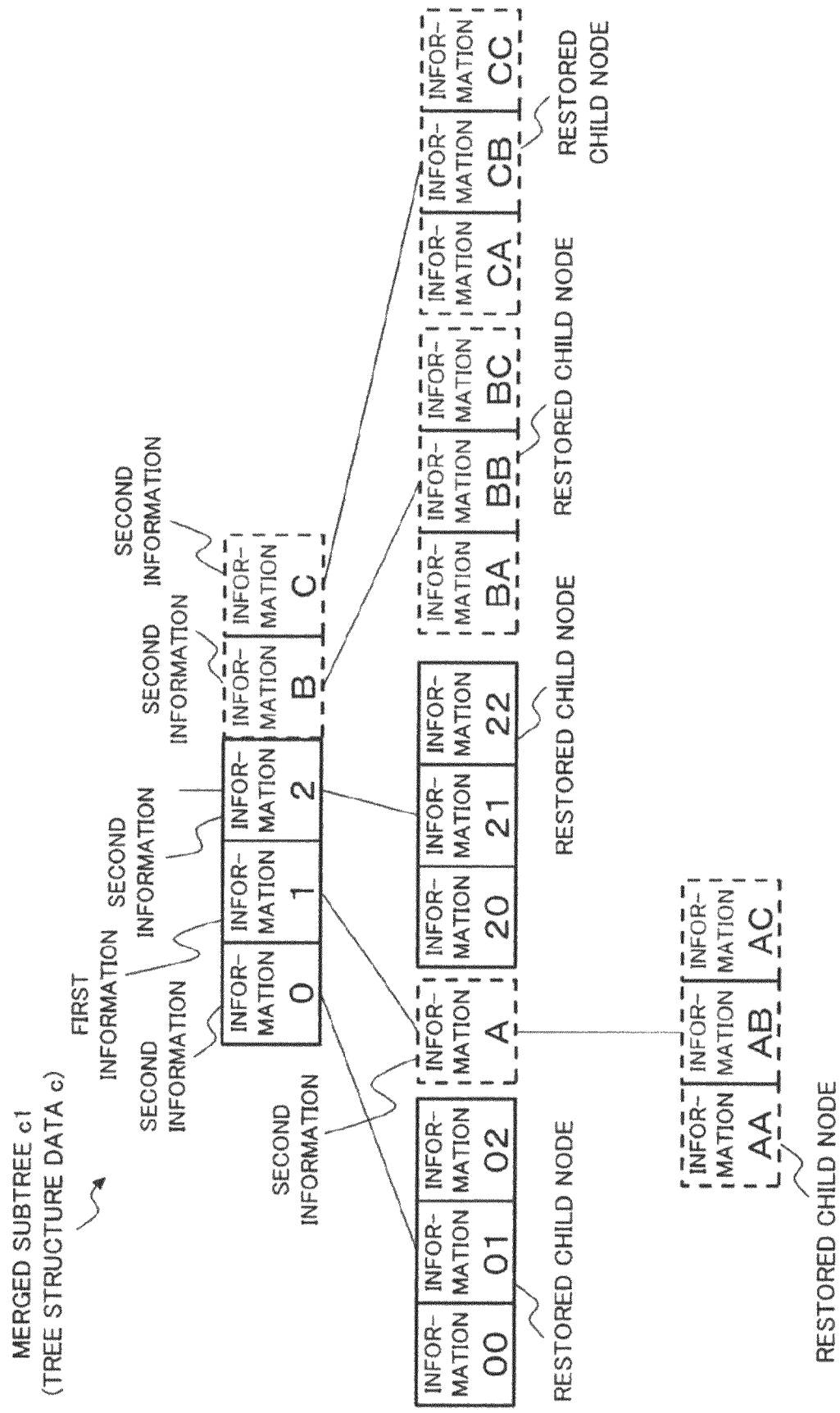
FIG. 10 is a diagram illustrating merged tree structure data in which child nodes are restored in the specific example of the second example embodiment of the present invention.

Similarly, the restoration unit 204 also connects, below the information 2, the information A, the information B, and the information C, child nodes connected to the respective pieces of information in the tree structure data a or the tree structure data b. Consequently, the tree structure data c in which child nodes are restored becomes as illustrated in FIG. 10.

Next, the selection unit 205 determines that the information 1 being first information in the merged subtree c1 is also connected to a child node in the tree structure data a originally including the information 1 (Yes in Step S27).

Figure 11:
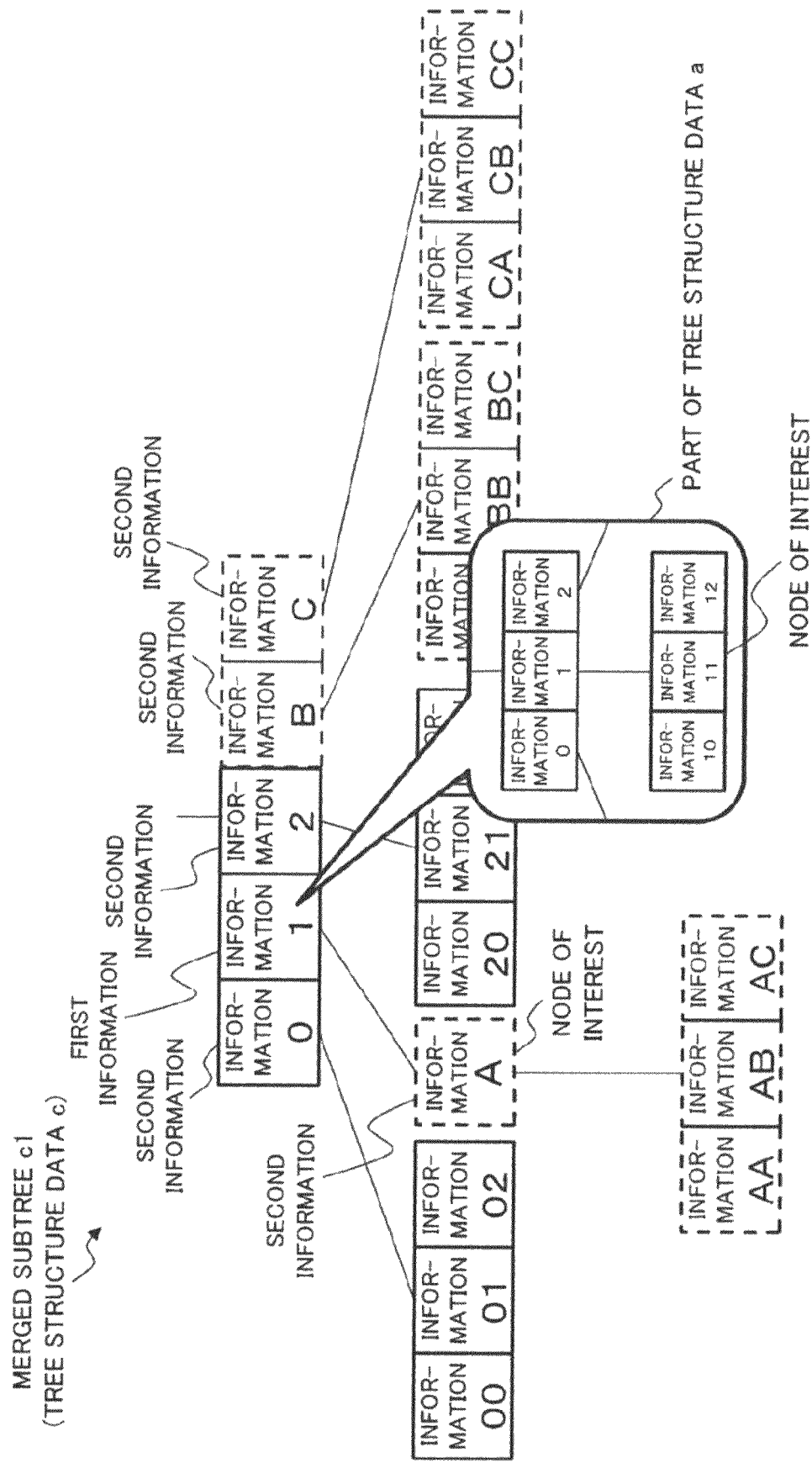
FIG. 11 is a diagram illustrating next nodes of interest in the specific example of the second example embodiment of the present invention.

Then, as illustrated in FIG. 11, the selection unit 205 selects the child node of the information 1 in the merged subtree c1 as one of new nodes of interest. The node includes the information A. Further, the selection unit 205 selects the child node connected to the information 1 in the tree structure data a as the other new node of interest. The node includes information 10, information 11, and information 12 (Step S28).

Next, the information processing device 20 repeats the operation from Step S24 with respect to the new nodes of interest selected in Step S28.

Specifically, with respect to the information A, the information 10, the information 11, and the information 12 included in the nodes of interest, the reorganization unit 203 generates a new merged subtree c2, based on an evaluation result between the pieces of information (Step S24).

Figure 12:
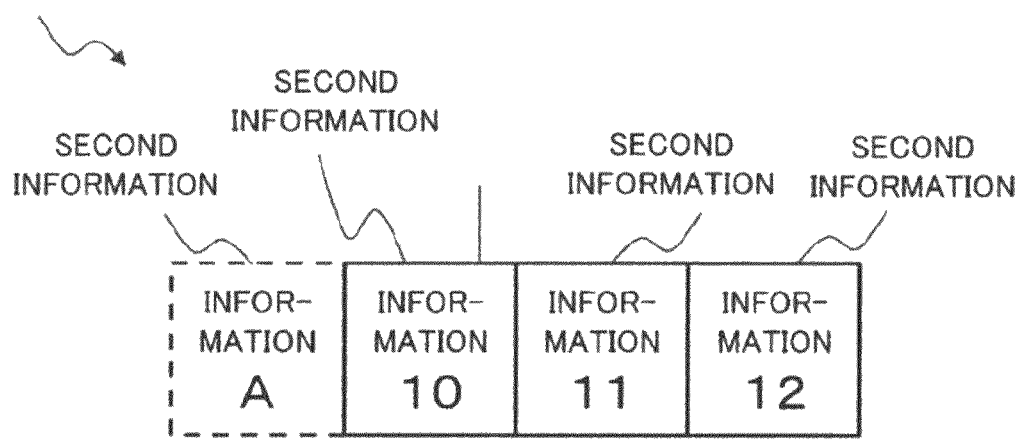
FIG. 12 is a diagram illustrating a merged subtree to be generated next in the specific example of the second example embodiment of the present invention.

Specifically, the reorganization unit 203 inserts the plurality of pieces of information into the merged subtree c2 in a random order, similarly to the previous operation. Then, it is assumed that a merged subtree c2 illustrated in FIG. 12 is generated. In FIG. 12, every piece of the information A, the information 10, the information 11, and the information 12 is arranged in the root node of the merged subtree c2. Further, in the merged subtree c2, every piece of the information A, the information 10, the information 11, and the information 12 is second information not including a child node.

Next, the reorganization unit 203 inserts the merged subtree c2 illustrated in FIG. 12 into a position based on the node of interest in the tree structure data c (Step S25).

In this case, the information A being one of the nodes of interest is a child node of the information 1 in the tree structure data c. Accordingly, the reorganization unit 203 inserts the merged subtree c2 illustrated in FIG. 12 into a position of a child node of the information 1 in the tree structure data c. Consequently, the tree structure data c becomes as illustrated in FIG. 13.

Next, the restoration unit 204 connects, to second information in the merged subtree c2 in FIG. 13, a subtree including a child node and below connected to the second information in the tree structure data a or tree structure data b (Step S26).

Figure 13:
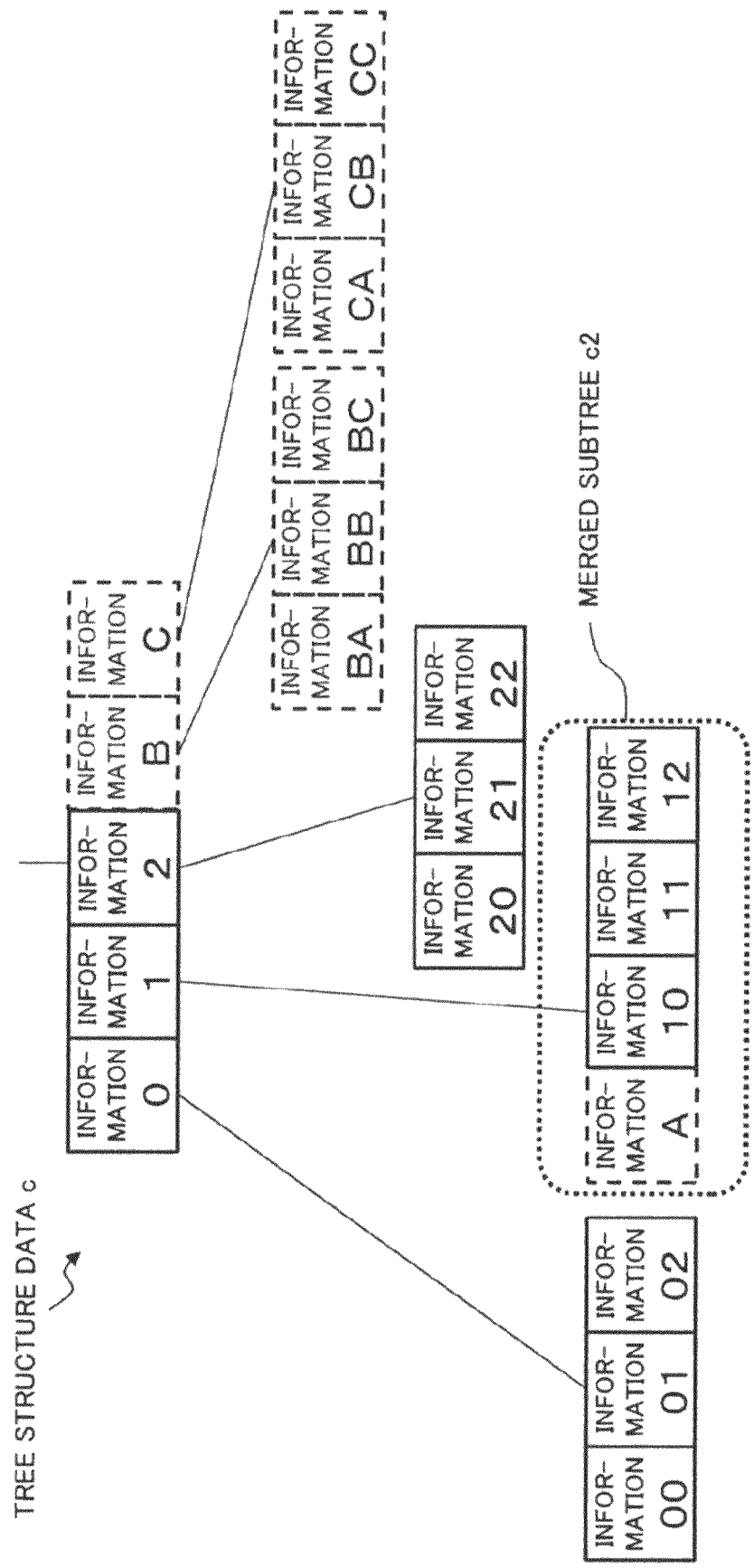
FIG. 13 is a diagram illustrating merged tree structure data into which a merged subtree is inserted in the specific example of the second example embodiment of the present invention.

In this case, out of the pieces of second information in the merged subtree c2 in FIG. 13, only the information A includes a child node in the tree structure data b originally including the information A. The child node includes the information AA, the information AB, and the information AC. Accordingly, the restoration unit 204 connects the child node including the information AA, the information AB, and the information AC below the information A in FIG. 13. Further, the other pieces of second information in the merged subtree c2 in FIG. 13 do not include a child node connected in the tree structure data a or tree structure data b. Accordingly, the restoration unit 204 does not restore a child node and below with respect to these pieces of second information. Consequently, the tree structure data c becomes as illustrated in FIG. 14.

Figure 14:
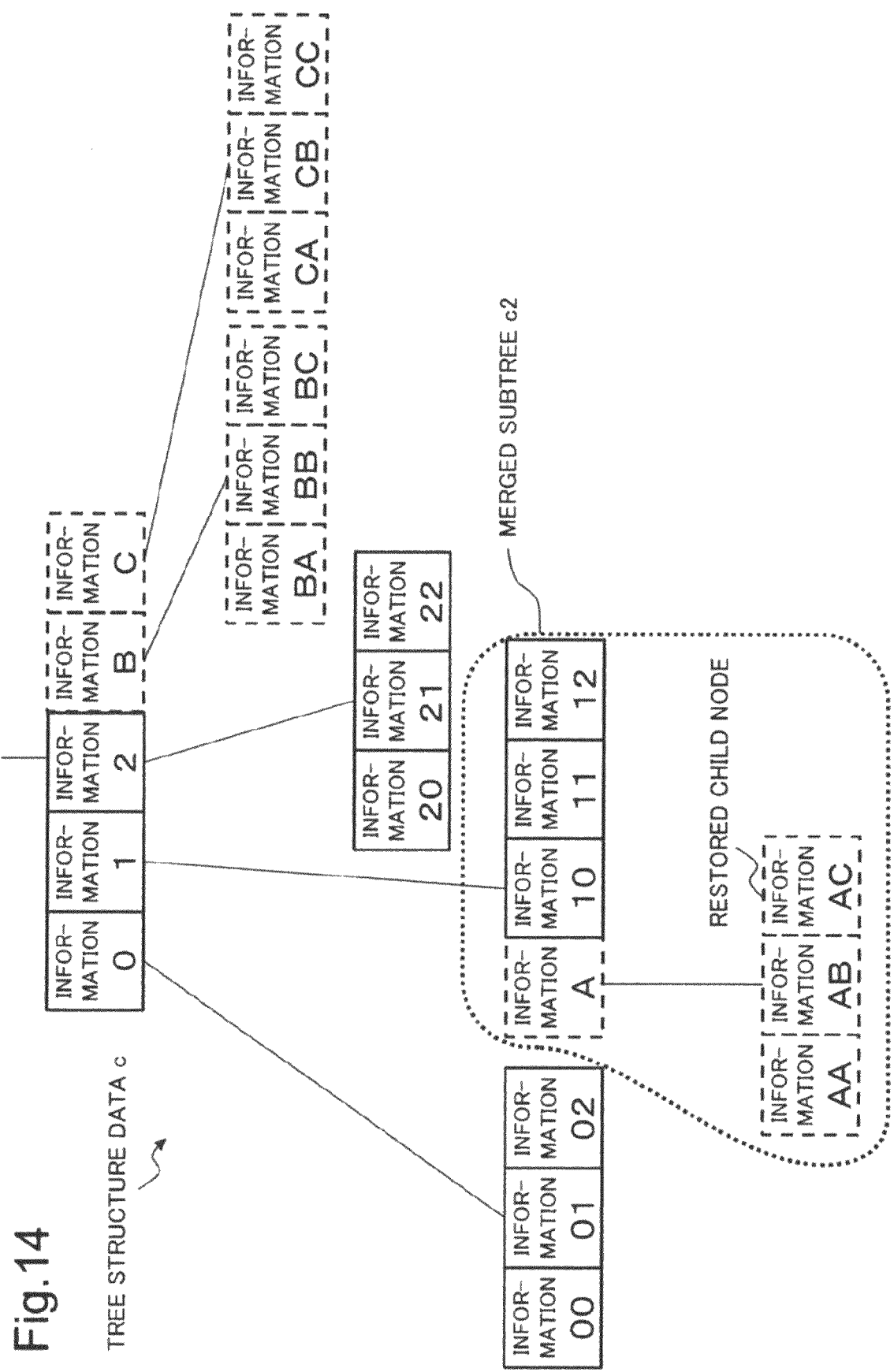
FIG. 14 is a diagram illustrating merged tree structure data in which a child node is restored in the specific example of the second example embodiment of the present invention.

Next, the selection unit 205 determines that the merged subtree c2 in FIG. 14 does not include first information (No in Step S27).

Accordingly, the information processing device 20 ends the operation.

Thus, the tree structure data a and the tree structure data b are merged and the tree structure data c illustrated in FIG. 14 are generated.

Next, an effect of the second example embodiment of the present invention will be described.

The information processing device 20 according to the present example embodiment can more efficiently and more accurately merge a plurality of tree structures representing information groups, based on an evaluation result of an evaluation function evaluating a distance between pieces of information, into one tree structure.

The reason will be described. In addition to a configuration similar to that according to the first example embodiment of the present invention, the present example embodiment includes a configuration as follows.

Specifically, the merger unit 202 includes the reorganization unit 203, the restoration unit 204, and the selection unit 205. With respect to a plurality of pieces of information included in each of a plurality of nodes of interest, the reorganization unit 203 generates a merged subtree, based on an evaluation result of an evaluation function evaluating a distance between pieces of information. Information including a child node in the merged subtree is determined to be first information, and information not including a child node in the merged subtree is determined to be second information.

Then, the reorganization unit 203 inserts the merged subtree into a position based on the node of interest in merged tree structure data. Further, the restoration unit 204 restores a child node and below connected to second information in tree structure data originally including the second information by connecting the child node and below to the second information in the merged subtree. Then, the selection unit 205 selects the root nodes of a plurality of tree structure data as nodes of interest and causes the reorganization unit 203 and the restoration unit 204 to function.

Subsequently, the selection unit 205 selects, as new nodes of interest, a child node connected to first information in the merged subtree and a child node connected to the first information in tree structure data originally including the first information and causes the reorganization unit 203 and the restoration unit 204 to function. Then, the selection unit 205 repeats selecting a new node of interest and causing the reorganization unit 203 and the restoration unit 204 to function.

Thus, the present example embodiment assumes that pieces of second information not including a child node in a merged subtree are mutually evaluated to be low, and therefore pieces of information included in child nodes connected to the pieces of second information in original tree structure data are also mutually evaluated to be low.

Accordingly, the present example embodiment improves efficiency of reorganization processing by not performing the reorganization processing on a tree structure based on an evaluation result between pieces of information, with respect to the information included in the child nodes connected to the pieces of second information in the tree structure data.

Further, first information including a child node in a merged subtree and information included in the child node are evaluated to be high. Accordingly, the present example embodiment assumes that information included in a child node of first information in a merged subtree and information included in a child node in a tree structure originally including the first information are evaluated to be high.

The present example embodiment recursively performs processing of generating a merged subtree with respect to the plurality of pieces of information evaluated to be high. Consequently, the present example embodiment accurately merges tree structure data while improving efficiency of processing.

For example, in the specific example described above, the information 0, the information 1, the information 2, the information B, and the information C are arranged in the same node when inserted into the merged subtree c1, and are mutually evaluated to be low. Since an evaluation result has correlation, pieces of information included in child nodes (or nodes at a lower level) of the aforementioned pieces of information are anticipated to be also mutually evaluated to be low.

Accordingly, the present example embodiment inserts information included in a subtree below the aforementioned pieces of information in the tree structure data into merged tree structure data, without performing evaluation processing of comparing the information with other information. Accordingly, efficiency of merger processing of generating the tree structure data c can be improved.

Further, according to the present example embodiment, the information A is arranged as a child node of the information 1 in the merged subtree c1, and therefore the information A and the information 1 are mutually evaluated to be high. Since an evaluation result has correlation, it is anticipated that the information A and information included in a child node of the information 1 in the tree structure data a (that is, the information 10 to 12) are mutually evaluated to be high. Accordingly, the information A and the information 10 to 12 are reorganized by being merged at a level below the information 1 in the tree structure data c.

Observation of the entire thus generated tree structure data c tells that pieces of information mutually evaluated to be high are arranged in the same node closer to an end. In other words, the merged tree structure data c are efficiently generated while a feature of the tree structure data is being retained.

As described above, the present example embodiment can efficiently and accurately merge tree structure data.

Third Example Embodiment

Next, a third example embodiment of the present invention will be described in detail with reference to drawings. In each drawing referred to in the description of the present example embodiment, a configuration identical to and a step operating similarly to those according to the second example embodiment of the present invention are respectively given reference signs identical to those in the second example embodiment, and detailed description thereof in the present example embodiment is omitted.

Figure 15:
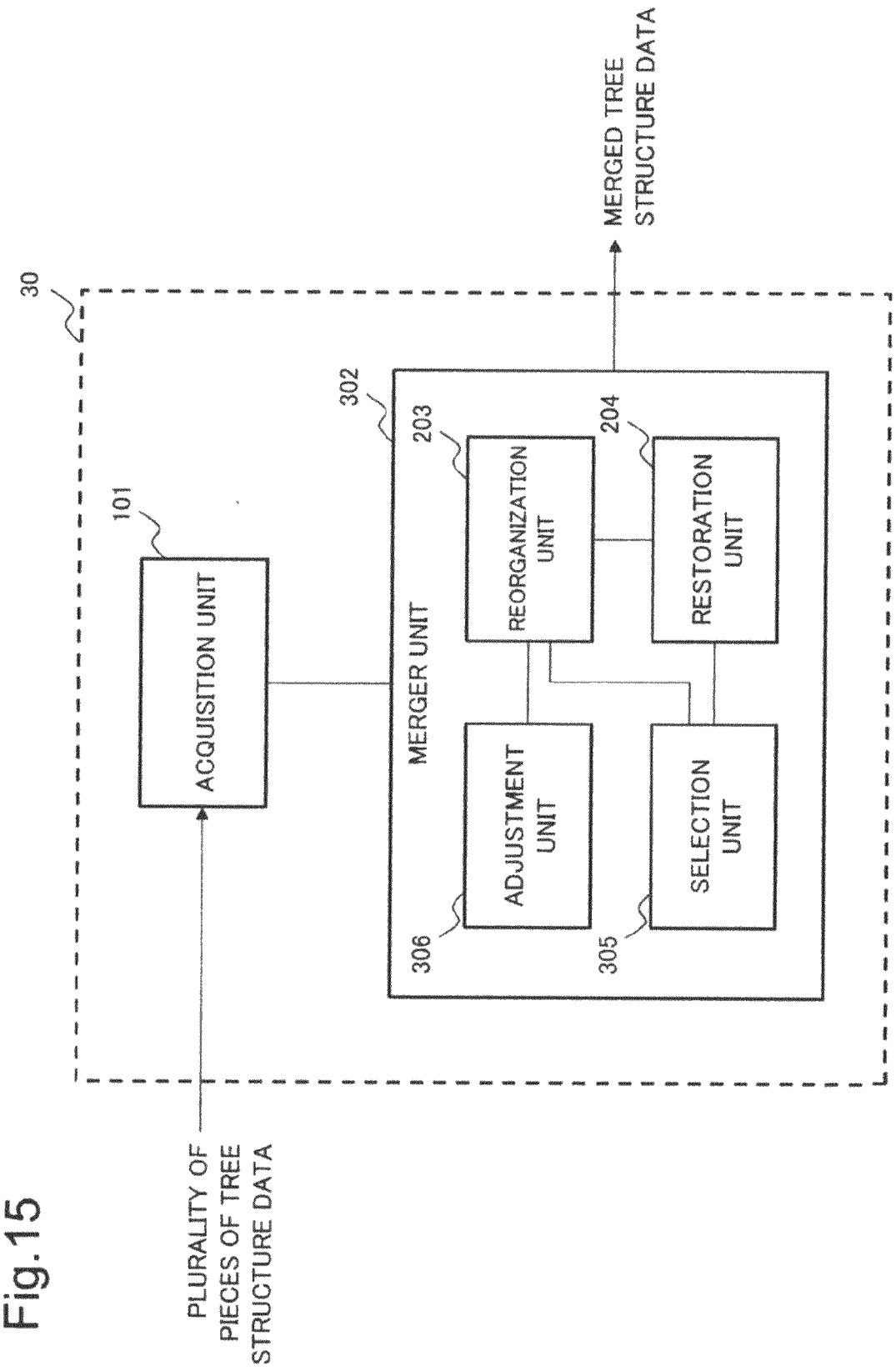
FIG. 15 is a diagram illustrating a functional block configuration of an information processing device according to a third example embodiment of the present invention.

First, FIG. 15 illustrates a functional block configuration of an information processing device 30 according to the third example embodiment of the present invention. In FIG. 15, the information processing device 30 differs from the information processing device 20 according to the second example embodiment of the present invention in including a merger unit 302 in place of the merger unit 202. The merger unit 302 differs from the merger unit 202 according to the second example embodiment of the present invention in including a selection unit 305 in place of the selection unit 205 and further including an adjustment unit 306.

The information processing device 30 and the respective functional blocks thereof can be configured with hardware components similar to those according to the first example embodiment of the present invention described with reference to FIG. 2. However, the hardware configuration of the information processing device 30 and the respective functional blocks thereof is not limited to the configuration described above.

The adjustment unit 306 adjusts a merged subtree such that an evaluation result between first information in the merged subtree and each information included in a grandchild node of the first information and below is less than a criterion value for being included in the child node of the first information or below.

Specifically, out of pieces of information included in a grandchild node of the first information and below in the merged subtree, the adjustment unit 306 detects information an evaluation result of which with the first information is lower than a criterion value for being included in the child node of the first information or below. For example, as the criterion value for being included in the child node of the first information or below, a threshold value based on an evaluation result between the first information and other information in a node including the first information may be applied.

Then, the adjustment unit 306 deletes the detected information from the merged subtree. At this time, the adjustment unit 306 stores the deleted information in a save area. Then, after completion of repetition processing by the selection unit 205, the adjustment unit 306 inserts each piece of information in the save area into merged tree structure data.

At this time, the adjustment unit 306 may determine a position into which information in the save area is inserted as follows. For example, the adjustment unit 306 may calculate an evaluation result by an evaluation function between each information included in the root node of merged tree structure data and information to be inserted. Then, the adjustment unit 306 may repeat calculation of an evaluation result by the evaluation function between each information included in a child node of information with the highest evaluation and the information to be inserted until the information with the highest evaluation no longer includes a child node.

However, when an evaluation between information to be inserted and the information providing the highest evaluation with the information to be inserted is lower than a criterion value for being included in a child node of the node or below in a certain node, the adjustment unit 306 may insert the information to be inserted into the node.

In addition to being configured similarly to the selection unit 205 according to the second example embodiment of the present invention, the selection unit 305 is configured as follows. Specifically, even in a case that first information including a child node in tree structure data originally including the first data does not exist in a merged subtree, when a node as described below exists, the selection unit 305 also selects such a node as a node of interest.

Such a node refers to a node including information included in a save area in original tree structure data and having never been selected as a node of interest. With respect to the thus selected node of interest, the selection unit 305 causes a reorganization unit 203 and a restoration unit 204 to function, similarly to the selection unit 205 according to the second example embodiment of the present invention.

An operation of the information processing device 30 configured as described above will be described with reference to FIG. 16.

Figure 16:
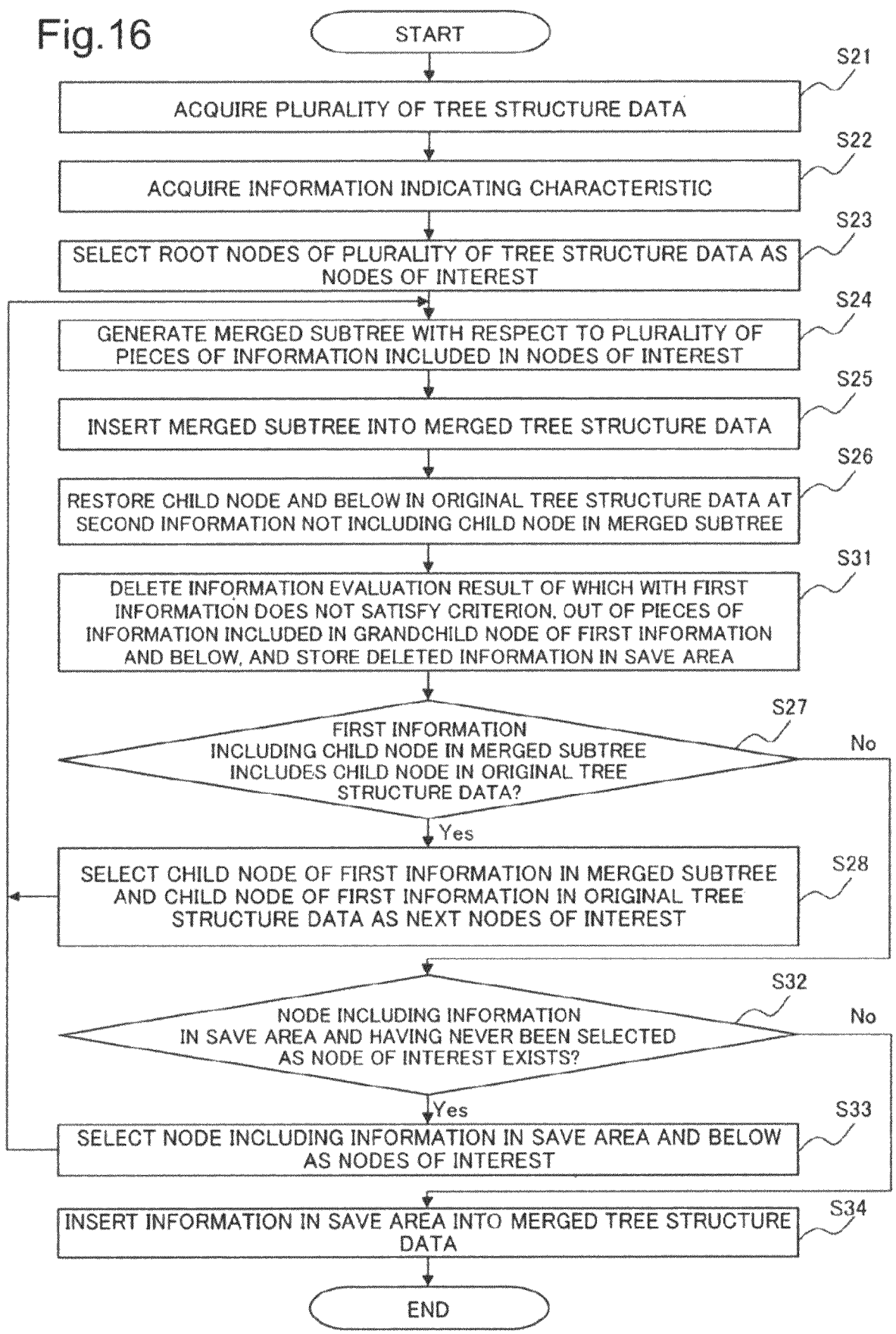
FIG. 16 is a flowchart illustrating an operation of the information processing device according to the third example embodiment of the present invention.

In FIG. 16, the information processing device 30 operates similarly to the second example embodiment of the present invention up to Steps S21 to S26. Consequently, a merged subtree is generated for a plurality of pieces of information included in a node of interest, and a child node below second information in the merged subtree is restored.

Next, out of pieces of information included in a grandchild node of first information and below in the merged subtree, the adjustment unit 306 detects information an evaluation result of which with the first information does not satisfy a criterion for being included in the child node of the first information or below. Then, the adjustment unit 306 deletes the detected information from the merged subtree and stores the information in a save area (Step S31).

Next, similarly to the second example embodiment of the present invention, when the determination in Step S27 is Yes, the information processing device 30 executes Step S28. Specifically, when applicable first information exists, a new node of interest is selected, and the processing from Step S24 is repeated.

On the other hand, a case that applicable first information does not exist in Step S27 will be described. In this case, the selection unit 305 determines whether or not a node including information saved in the save area in original tree structure data and having never been selected as a node of interest exists (Step S32).

A case that an applicable node exists will be described (Yes in Step S32). In this case, the selection unit 305 selects the applicable node and below in the tree structure data as new nodes of interest (Step S33).

Then, the information processing device 30 repeats the processing from Step S24 on the new node of interest selected in Step S33.

When a plurality of applicable nodes exist in Step S32, the information processing device 30 repeatedly executes Step S33 and the processing from Step S24 on each node.

On the other hand, when an applicable node does not exist in Step S32 (No in Step S32), the adjustment unit 306 inserts the information stored in the save area in Step S31 into merged tree structure data (Step S34).

Then, the information processing device 30 ends the operation.

Next, an operation of the information processing device 30 will be presented by a specific example. It is assumed in this specific example that the information processing device 30 merges two tree structure data d and e, and generates merged tree structure data f. It is further assumed in this specific example that information constituting a tree structure is a facial image. It is further assumed that an evaluation function evaluating a distance between facial images outputs a numerical value indicating a degree of similarity between the facial images.

Figure 17:
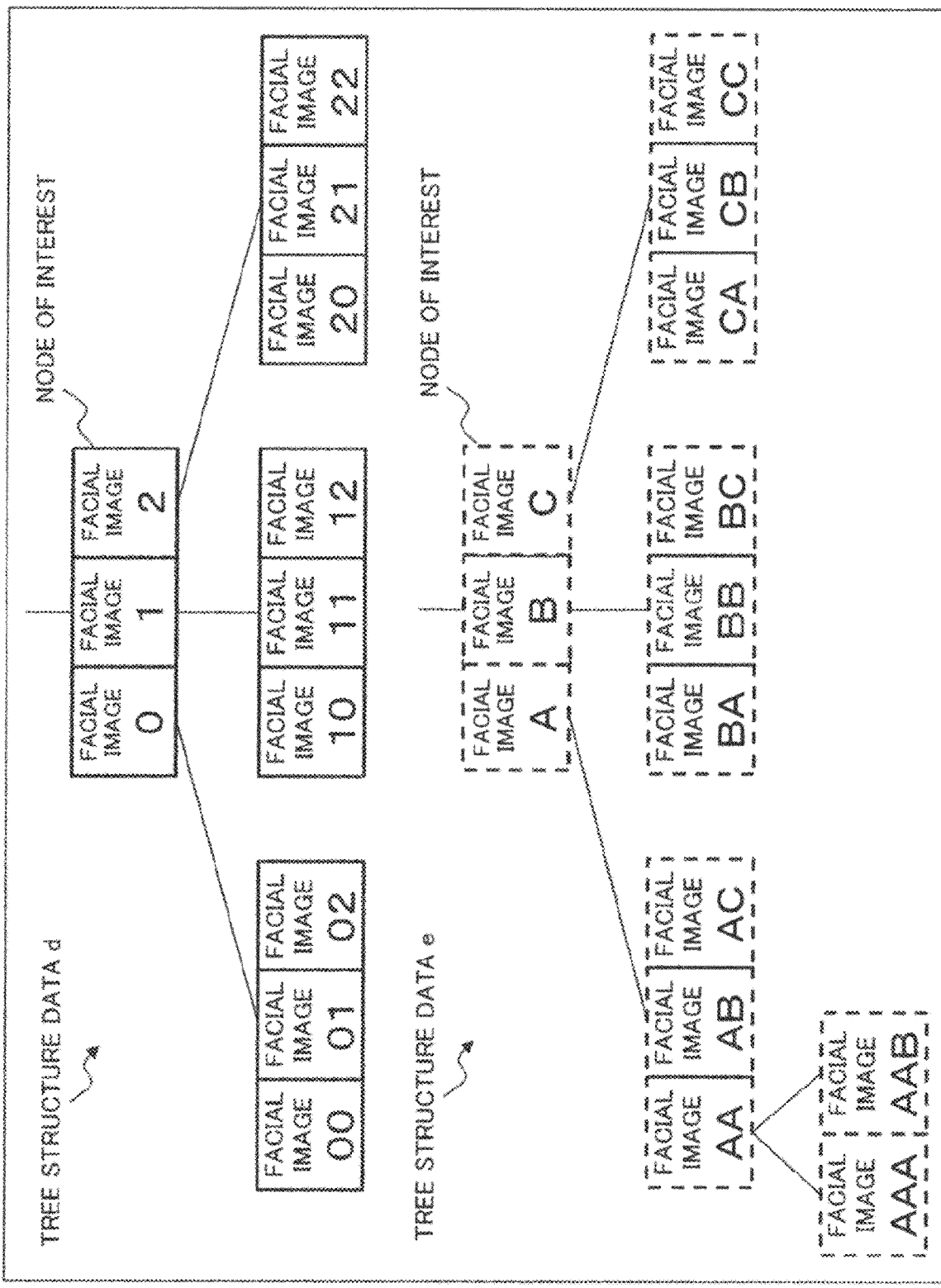
FIG. 17 is a diagram illustrating two tree structure data to be merged in a specific example of the third example embodiment of the present invention.

First, it is assumed that an acquisition unit 101 acquires the tree structure data d and the tree structure data e illustrated in FIG. 17 (Step S21).

In FIG. 17, a facial image included in each node in the tree structure data d is represented by a solid rectangle. A facial image included in each node in the tree structure data e is represented by a dotted rectangle. In the tree structure data d, the root node includes a facial image 0, a facial image 1, and a facial image 2. Further, in the tree structure data e, the root node includes a facial image A, a facial image B, and a facial image C. In FIG. 17, a facial image with an identifier "X" is denoted as a facial image X. In this case, a numeral or an alphabetical letter is applied to "X."

Further, an identifier of a facial image included in a child node of a facial image X is denoted as "XY." Accordingly, a facial image included in a child node of a facial image X is denoted as a facial image XY. In this case, a numeral or an alphabetical letter is applied to "Y." Further, an identifier of a facial image included in a child node of a facial image XY is denoted as "XYZ." Accordingly, a facial image included in a child node of a facial image XY is denoted as a facial image XYZ. In this case, a numeral or an alphabetical letter is applied to "Z."

For example, in FIG. 17, a child node of the facial image 0 included in the root node of the tree structure data d includes a facial image 00, a facial image 01, and a facial image 02. Further, a child node of the facial image A included in the root node of the tree structure data e includes a facial image AA, a facial image AB, and a facial image AC. Further, a child node of the facial image AA in the tree structure data e includes a facial image AAA and a facial image AAB.

Figure 18:
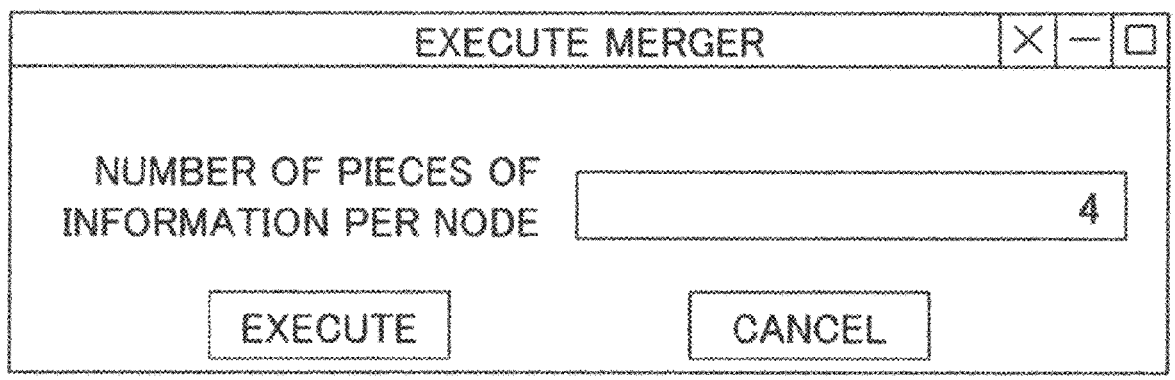
FIG. 18 is a diagram illustrating a screen for acquiring information indicating a characteristic to be applied to merged tree structure data in the specific example of the third example embodiment of the present invention.

Next, the merger unit 302 acquires a maximum number of facial images included in a node as information indicating a characteristic applied to merged tree structure data. It is assumed in this specific example that the merger unit 302 outputs a user interface screen illustrated in FIG. 18 to an output device 1003 and acquires information indicating a maximum number 4 through an input device 1004 (Step S22).

Next, the selection unit 305 selects the root node of the tree structure data d and the root node of the tree structure data e as nodes of interest (Step S23).

Next, with respect to a plurality of facial images composed of facial images included in the nodes of interest, the reorganization unit 203 generates a merged subtree f1, based on a degree of similarity between the facial images (Step S24).

In this case, the root node of the tree structure data d and the root node of the tree structure data e being the nodes of interest include the facial image 0, the facial image 1, the facial image 2, the facial image A, the facial image B, and the facial image C.

Then, the reorganization unit 203 inserts the plurality of facial images into the merged subtree f1 in a random order. For example, a facial image selected first is put in the root node of the merged subtree f1. Further, with respect to a facial image selected next, when a facial image a degree of similarity of which with the selected facial image is greater than or equal to a threshold value exists in facial images already put in the root node of the merged subtree f1, the selected facial image is put in a child node of such a facial image.

When a degree of similarity with any of the facial images already put in the root node of the merged subtree f1 is less than the threshold value, the selected facial image is put in the root node.

Figure 19:
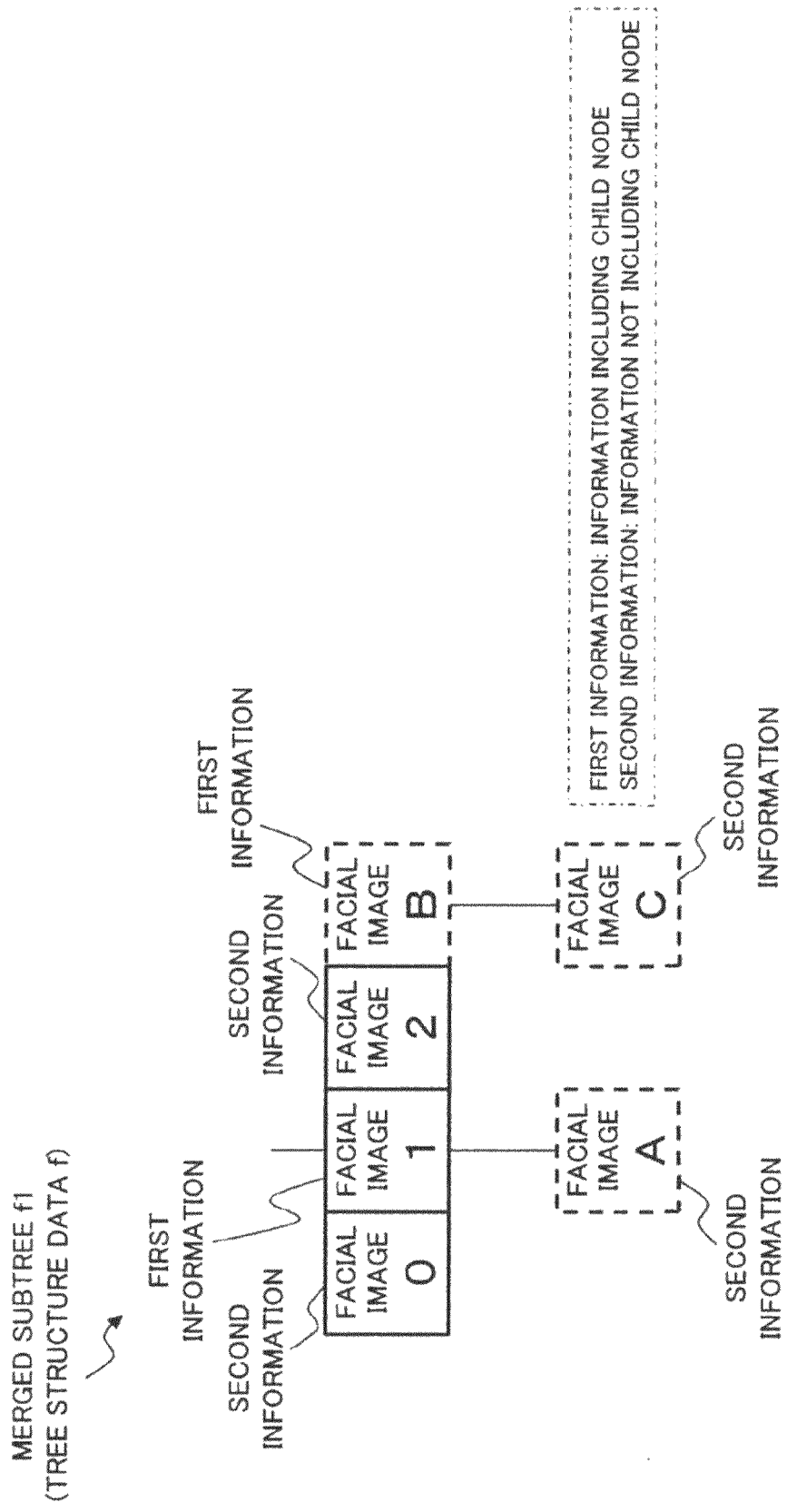
FIG. 19 is a diagram illustrating a merged subtree generated in the specific example of the third example embodiment of the present invention.

It is assumed that a merged subtree f1 illustrated in FIG. 19 is thus generated. In FIG. 19, the facial image 0, the facial image 1, the facial image 2, and the facial image B are arranged in the root node of the merged subtree f1. Further, the facial image A is arranged in a child node of the facial image 1. Further, the facial image C is arranged in a child node of the facial image B.

In FIG. 19, each of the facial image 1 and the facial image B is first information including a child node. Further, each of the facial image 0, the facial image 2, the facial image A, and the facial image C is second information not including a child node.

The reorganization unit 203 inserts the merged subtree f1 illustrated in FIG. 19 into a position based on the node of interest in the tree structure data f (Step S25).

In this case, the nodes of interest are the root nodes of the tree structure data d and the tree structure data e, and therefore the position based on the node of interest is a position of the root node of the tree structure data f. Accordingly, similarly to the specific example of the second example embodiment of the present invention, the merged subtree f1 illustrated in FIG. 19 becomes the tree structure data f as-is.

Next, the restoration unit 204 connects, to each piece of the second information in FIG. 19, a child node and below connected to the second information in the tree structure data d or the tree structure data f (Step S26).

In FIG. 19, as described above, pieces of second information not including a child node are the facial image 0, the facial image 2, the facial image A, and the facial image C. Further, for example, in the tree structure data d originally including the facial image 0, the child node connected to the facial image 0 includes the facial image 00, the facial image 01, and the facial image 02. Accordingly, the restoration unit 204 restores the child node including the facial image 00, the facial image 01, and the facial image 02 by connecting the child node below the facial image 0 in FIG. 19.

Figure 20:
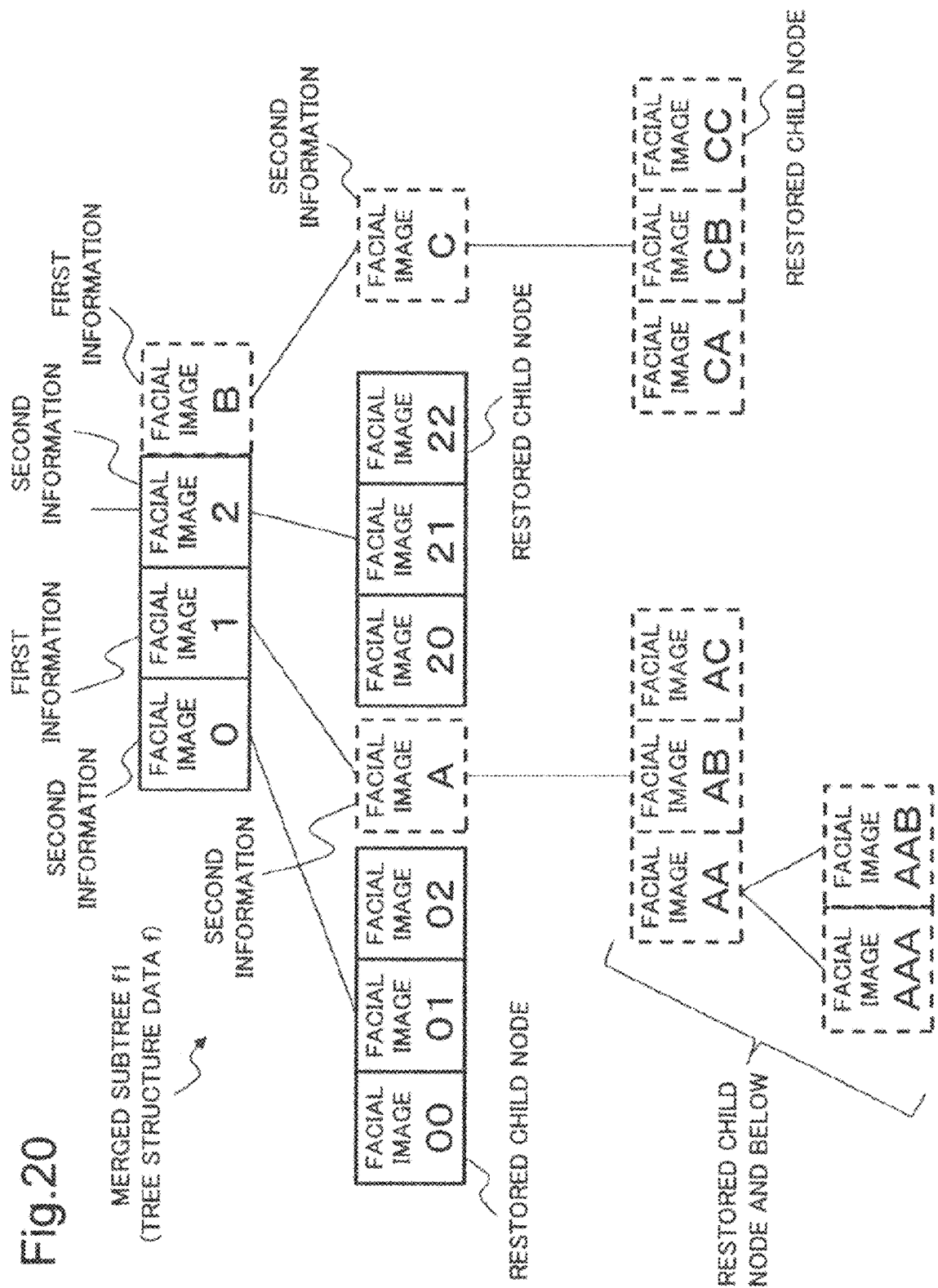
FIG. 20 is a diagram illustrating merged tree structure data in which child nodes are restored in the specific example of the third example embodiment of the present invention.

Similarly, the restoration unit 204 connects, below the facial image 2, the facial image A, and the facial image C, a child node and below connected to each of the facial images in the tree structure data d or the tree structure data e. Consequently, tree structure data f in which child nodes and below are restored become as illustrated in FIG. 20.

Next, the adjustment unit 306 calculates a degree of similarity between the facial image 1 being one of the pieces of first information in the merged subtree f1 in FIG. 20 and each of the facial image AA, the facial image AB, the facial image AC, the facial image AAA, and the facial image AAB included in the grandchild node of the facial image 1 and below. Then, it is assumed that the adjustment unit 306 detects the facial image AA as a facial image a degree of similarity of which with the facial image 1 is less than a criterion value for being included in a child node of the facial image 1 or below. The adjustment unit 306 deletes the facial image AA from the tree structure data f in FIG. 20 and stores the image in a save area (Step S31).

Similarly, the adjustment unit 306 calculates a degree of similarity between the facial image B being the other piece of first information in the merged subtree f1 in FIG. 20 with each of the facial image CA, the facial image CB, and the facial image CC included in the grandchild node of the facial image B and below. Then, it is assumed that the adjustment unit 306 detects the facial image CB as a facial image a degree of similarity of which with the facial image B is less than a criterion value for being included in a child node of the facial image B or below. The adjustment unit 306 deletes the facial image CB from the tree structure data f in FIG. 20 and stores the image in the save area (Step S31).

Figure 21:
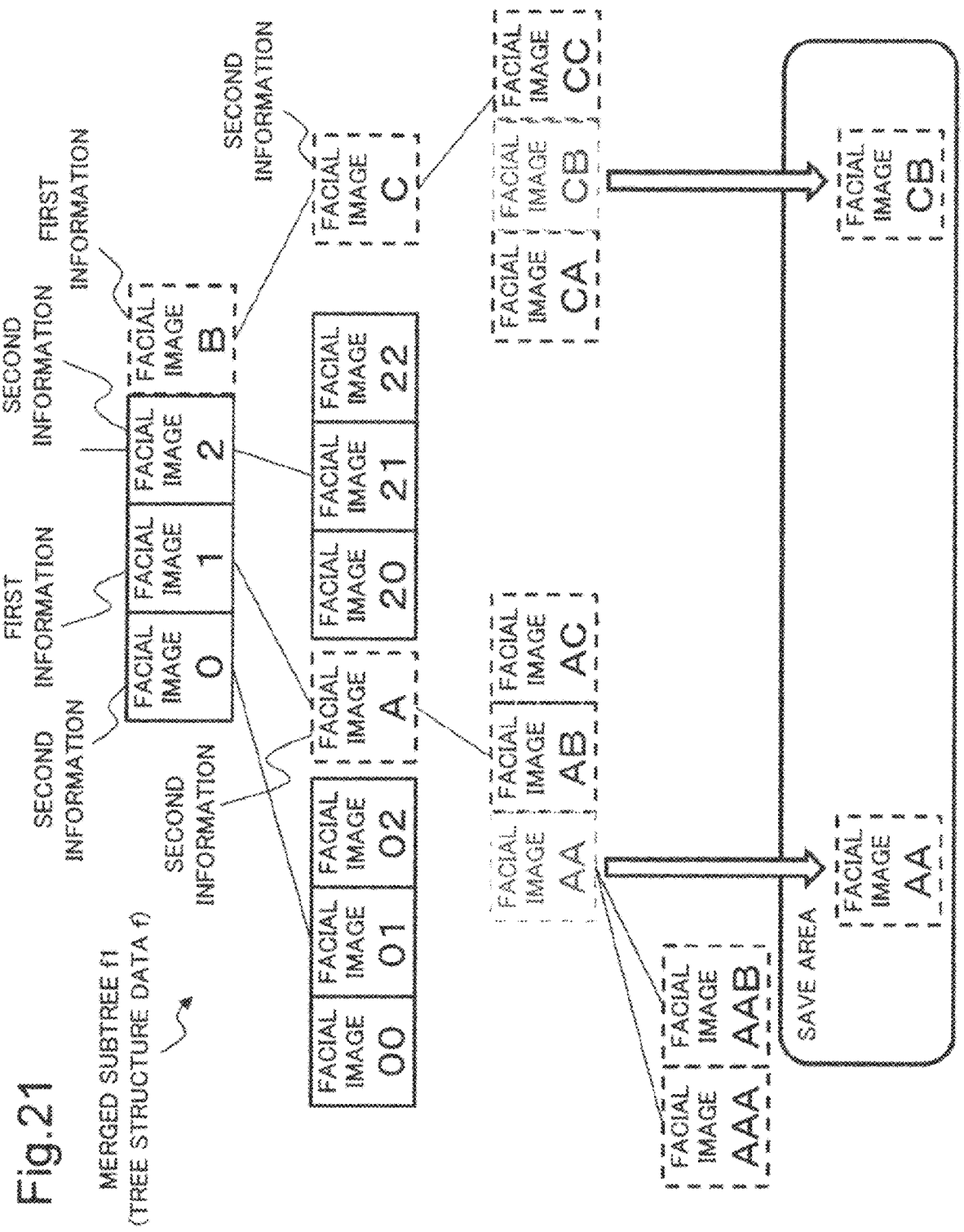
FIG. 21 is a diagram illustrating adjusted merged tree structure data in the specific example of the third example embodiment of the present invention.

In Step S31, the tree structure data f in which the facial image AA and the facial image CB are deleted for adjustment becomes as illustrated in FIG. 21. Further, the facial image AA and the facial image CB are stored in the save area.

Next, the selection unit 305 determines that a child node is also connected to the facial image 1 being one of the pieces of first information in the merged subtree f1 in FIG. 21, in the tree structure data d originally including the facial image 1. Further, the selection unit 305 determines that a child node is also connected to the facial image B being the other piece of first information in the merged subtree f1, in the tree structure data e originally including the facial image B (Yes in Step S27).

In this case, the selection unit 305 further generates merged subtrees with respect to a child node of the facial image 1 being one of the pieces of first information and below, and a child node of the facial image B being the other piece of first information and below, respectively.

Generation of a merged subtree f2 in and below a child node of the facial image 1 will be described below.

Figure 22:
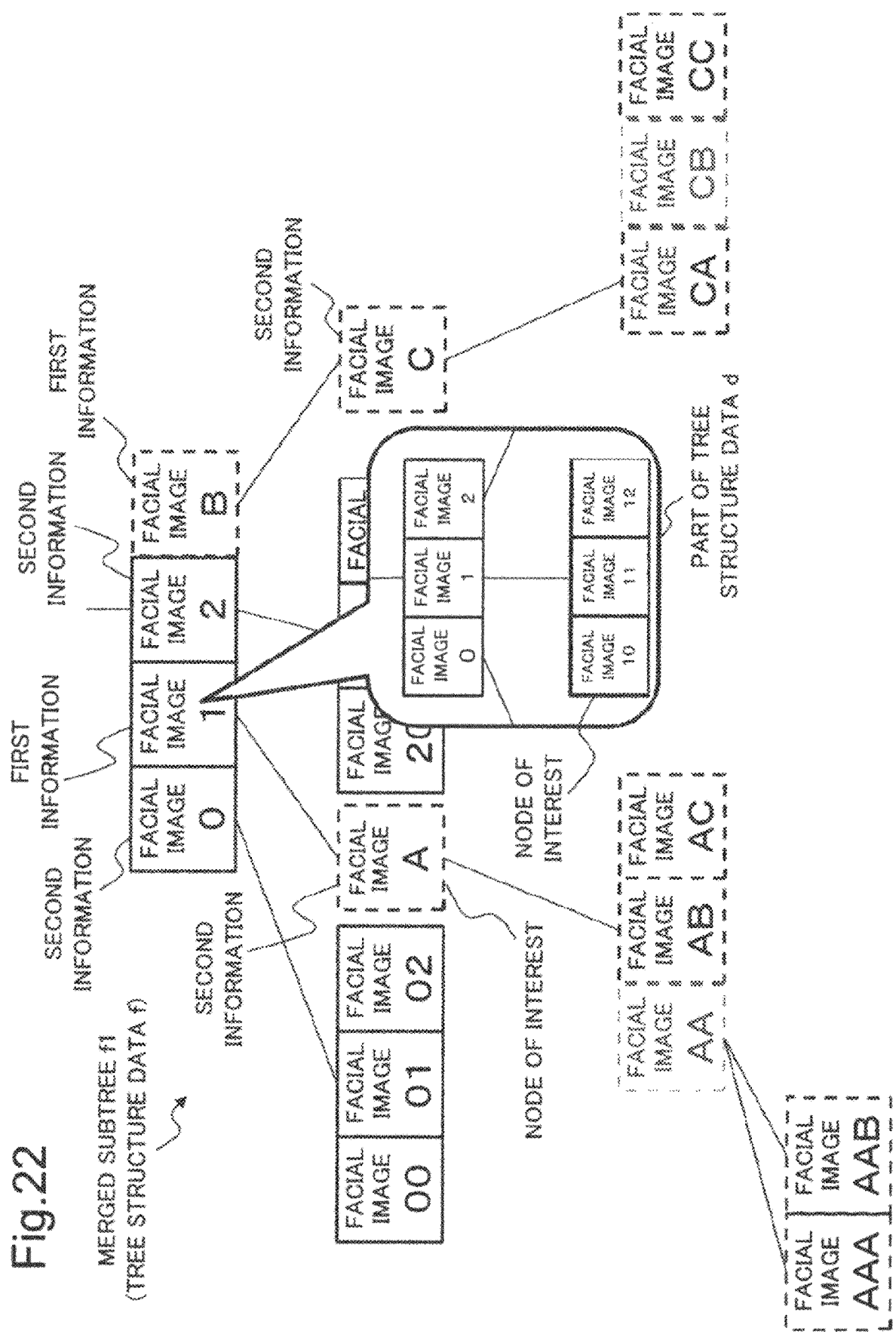
FIG. 22 is a diagram illustrating next nodes of interest in the specific example of the third example embodiment of the present invention.

First, as illustrated in FIG. 22, the selection unit 305 selects the child node of the facial image 1 in the merged subtree f1 as one of new nodes of interest. The node includes the facial image A. Further, the selection unit 305 selects the child node connected to the facial image 1 in the tree structure data d as the other new node of interest. The node includes the facial image 10, the facial image 11, and the facial image 12 (Step S28).

Next, the information processing device 30 repeats the operation from Step S24 on the new nodes of interest selected in Step S28.

Specifically, the reorganization unit 203 generates a new merged subtree f2 with respect to the facial image A, the facial image 10, the facial image 11, and the facial image 12 included in the nodes of interest, based on a degree of similarity between the facial images (Step S24).

Specifically, the reorganization unit 203 inserts the plurality of facial images into the merged subtree f2 in a random order, similarly to the previous operation. Then, the merged subtree f2 illustrated in FIG. 23 is generated.

Figure 23:
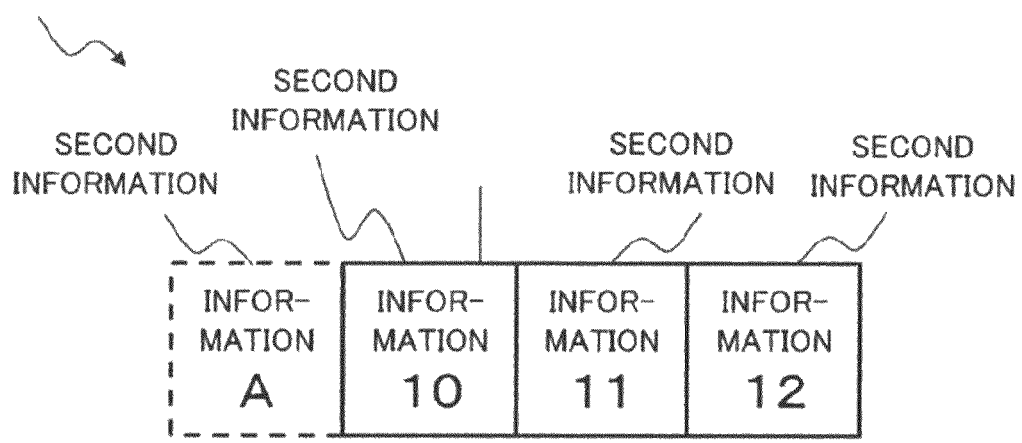
FIG. 23 is a diagram illustrating a merged subtree to be generated next in the specific example of the third example embodiment of the present invention.

In FIG. 23, every one of the facial image A, the facial image 10, the facial image 11, and the facial image 12 is arranged in the root node of the merged subtree f2. Further, in the merged subtree f2, every one of the facial image A, the facial image 10, the facial image 11, and the facial image 12 is second information not including a child node.

Next, the reorganization unit 203 inserts the merged subtree f2 illustrated in FIG. 23 into a position based on the node of interest in the tree structure data f (Step S25).

The facial image A being one of the nodes of interest is a child node of the facial image 1 in the tree structure data f. Accordingly, the reorganization unit 203 inserts the merged subtree f2 into a position of a child node of the facial image 1 in the tree structure data f. Consequently, the tree structure data f becomes as illustrated in FIG. 24.

Next, the restoration unit 204 connects, to second information in the merged subtree f2 in FIG. 24, a child node and below connected to the second information in the tree structure data d or tree structure data e (Step S26).

Figure 24:
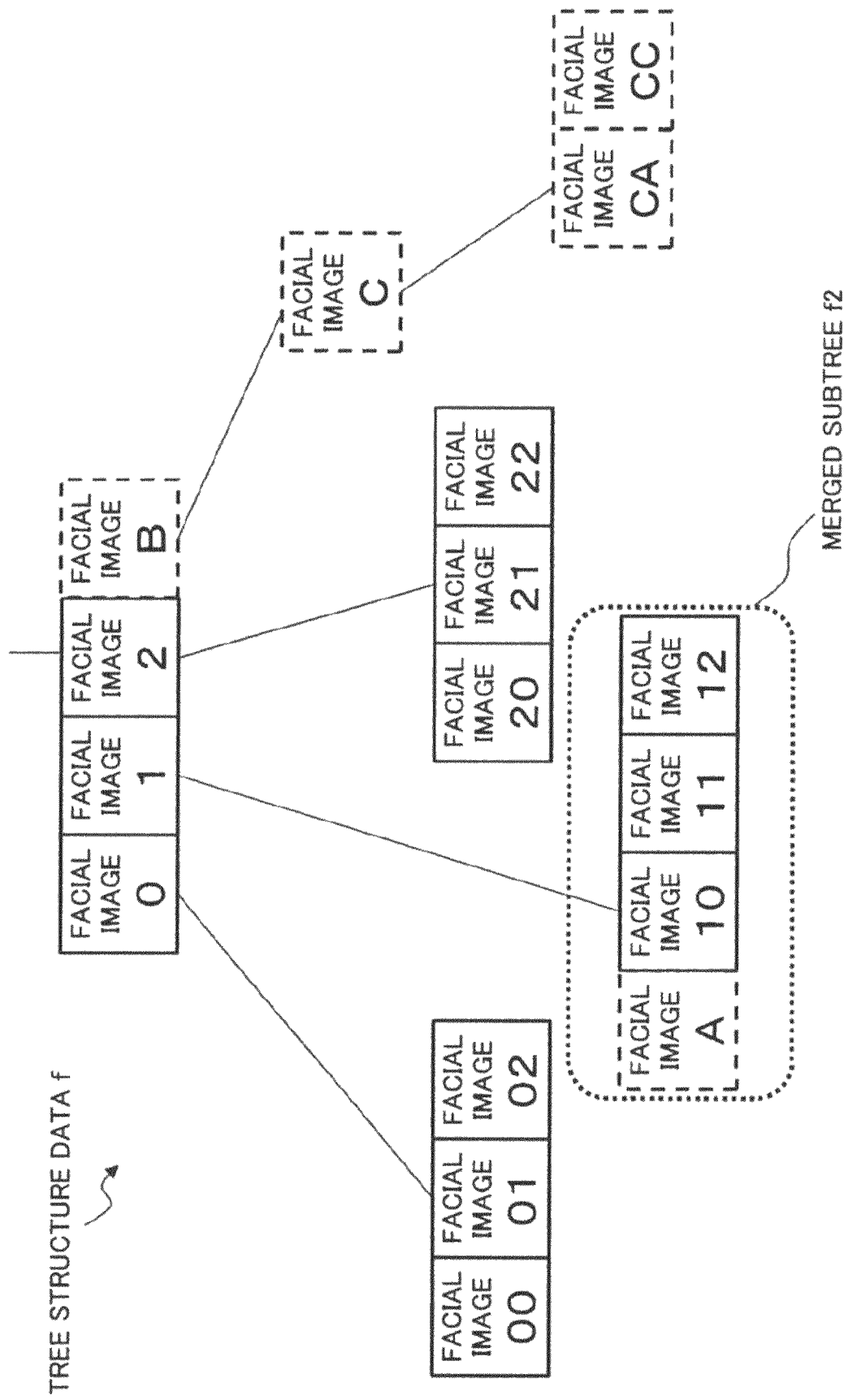
FIG. 24 is a diagram illustrating merged tree structure data in which a merged subtree is inserted in the specific example of the third example embodiment of the present invention.

Out of the pieces of second information in the merged subtree f2 in FIG. 24, only the facial image A includes a child node in the tree structure data e originally including the facial image A. While the child node includes the facial image AA, the facial image AB, and the facial image AC, the facial image AA is stored in the save area. Accordingly, the restoration unit 204 restores a child node including the facial image AB and facial image AC, excluding the facial image AA, by connecting the child node below the facial image A in FIG. 24.

Figure 25:
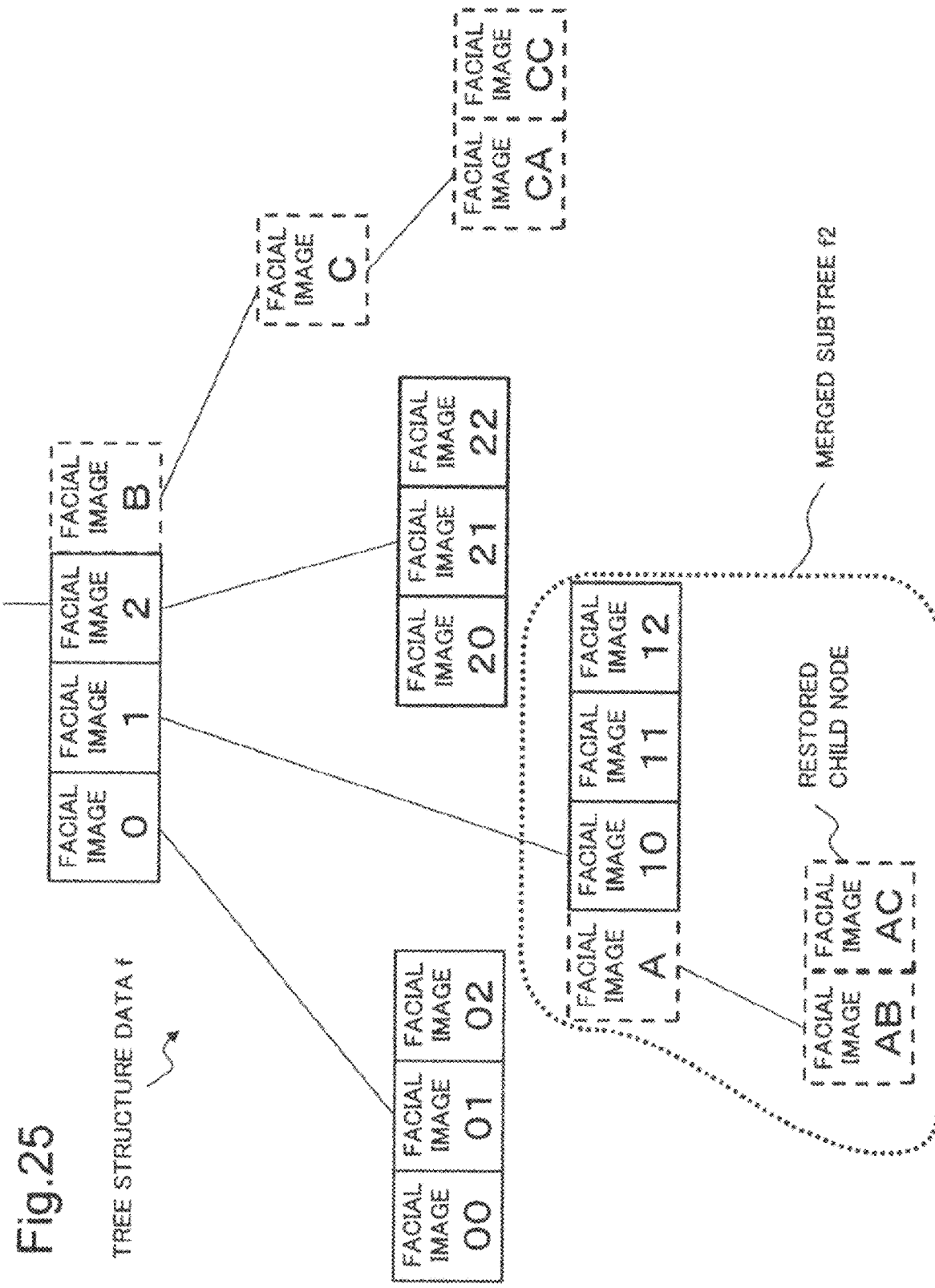
FIG. 25 is a diagram illustrating merged tree structure data in which a child node is restored in the specific example of the third example embodiment of the present invention.

Further, the facial image 10, the facial image 11, and the facial image 12 being the other pieces of second information in the merged subtree f2 in FIG. 24 do not include a child node connected in the tree structure data d or tree structure data f. Accordingly, the restoration unit 204 does not restore a child node and below with respect to these pieces of second information. Consequently, the tree structure data f in which a child node is restored becomes as illustrated in FIG. 25.

Further, the merged subtree f2 does not include first information. Accordingly, the adjustment unit 306 does not make an adjustment in the merged subtree f2 (Step S31). Further, since the merged subtree f2 does not include first information (No in Step S27), the processing transitions to next Step S32. Step S32 will be described later.

Next, further generation of a merged subtree with respect to the facial image B being the other piece of first information in the merged subtree f1 and below will be described.

Figure 26:
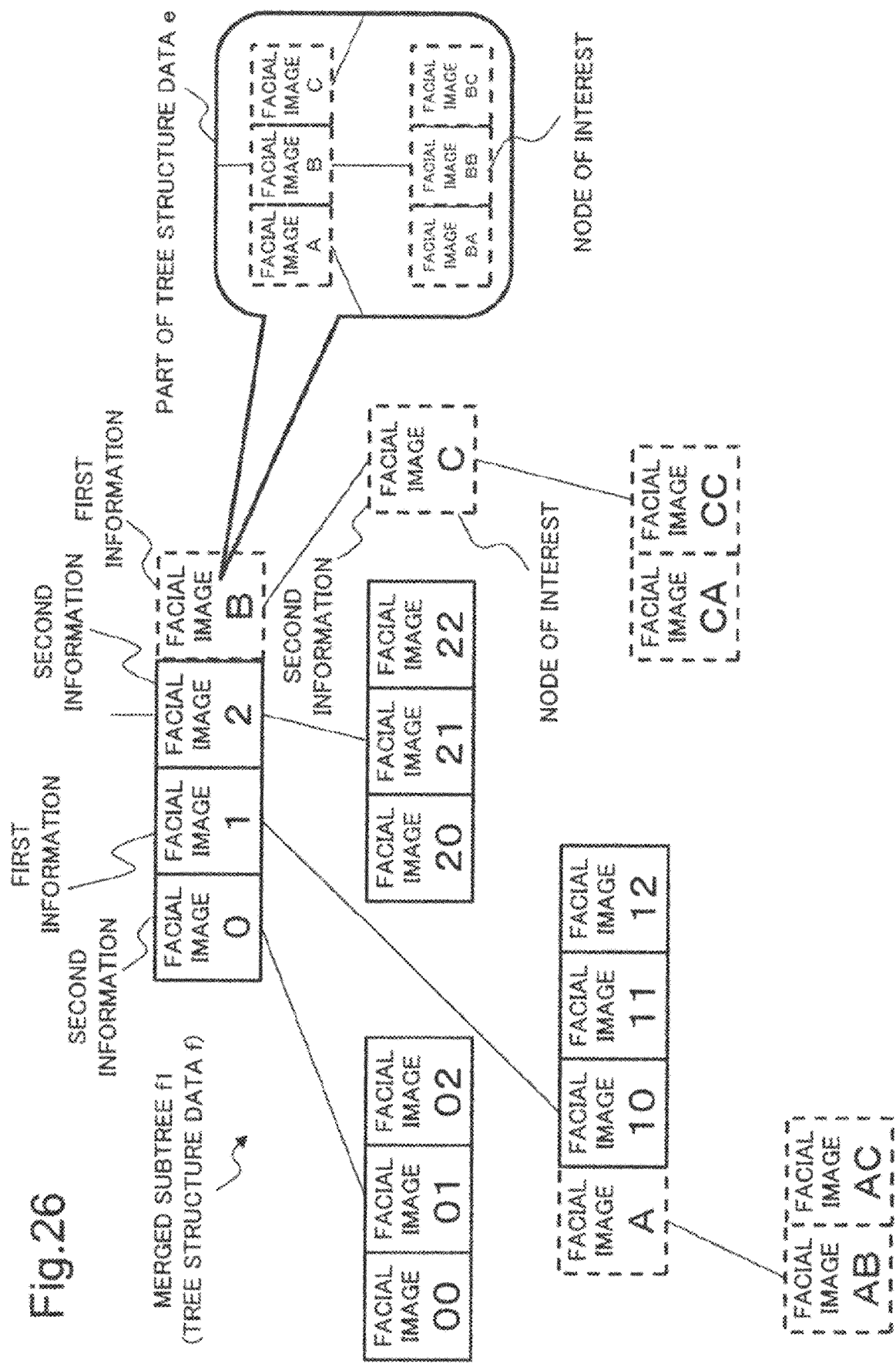
FIG. 26 is a diagram illustrating next nodes of interest in the specific example of the third example embodiment of the present invention.

First, as illustrated in FIG. 26, the selection unit 305 selects the child node of the facial image B in the merged subtree f1 as one of new nodes of interest. The node includes the facial image C. Further, the selection unit 305 selects the child node connected to the facial image B in the tree structure data e as the other new node of interest. The node includes a facial image BA, a facial image BB, and a facial image BC (Step S28).

Then, the information processing device 30 repeats the operation from Step S24 on the new nodes of interest selected in Step S28.

First, the reorganization unit 203 generates a new merged subtree f3 with respect to the facial image C, the facial image BA, the facial image BB, and the facial image BC included in the nodes of interest, based on a degree of similarity between the facial images (Step S24).

Specifically, the reorganization unit 203 inserts the plurality of facial images into the merged subtree f3 in a random order, similarly to the previous operation. Then, the merged subtree f3 illustrated in FIG. 27 is generated.

Figure 27:
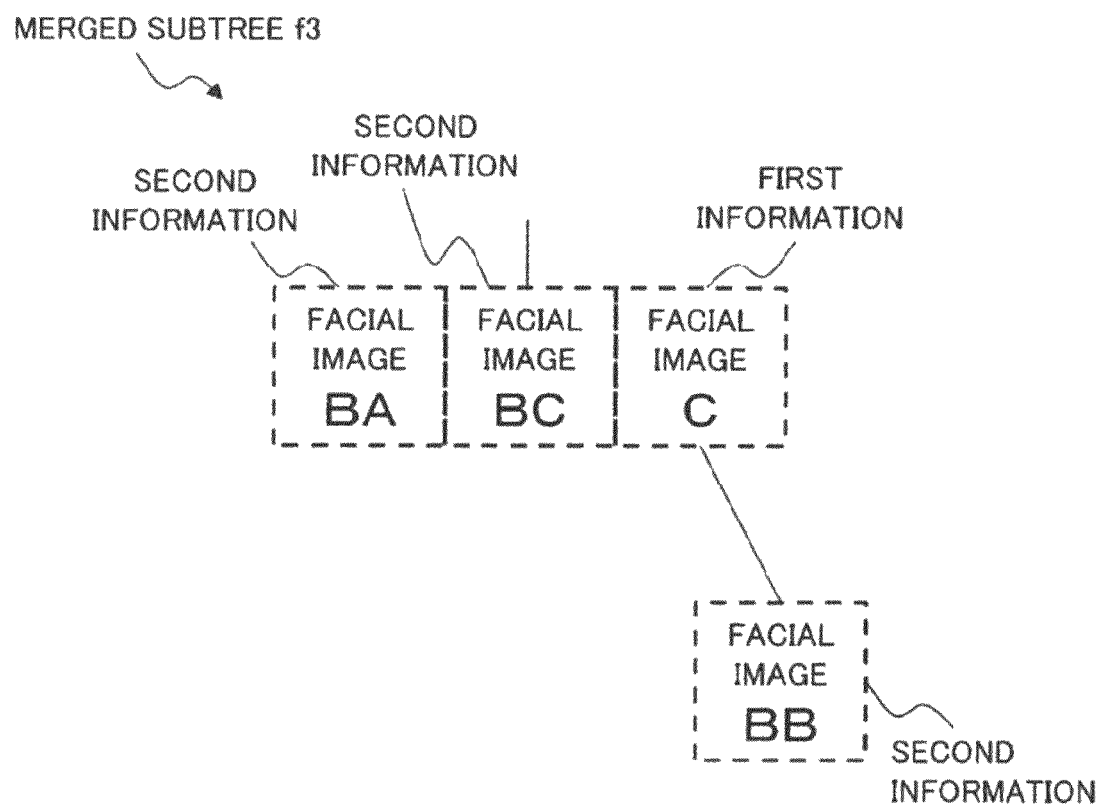
FIG. 27 is a diagram illustrating a merged subtree to be generated next in the specific example of the third example embodiment of the present invention.

In FIG. 27, the facial image BA, the facial image BC, and the facial image C are arranged in the root node of the merged subtree f3. Further, the facial image BB is arranged in a child node of the facial image C. In the merged subtree f3, the facial image C is first information including a child node. Further, each of the facial image BA, the facial image BB, and the facial image BC is second information not including a child node.

Next, the reorganization unit 203 inserts the merged subtree f3 illustrated in FIG. 27 into a position based on the node of interest in the tree structure data f (Step S25).

Figure 28:
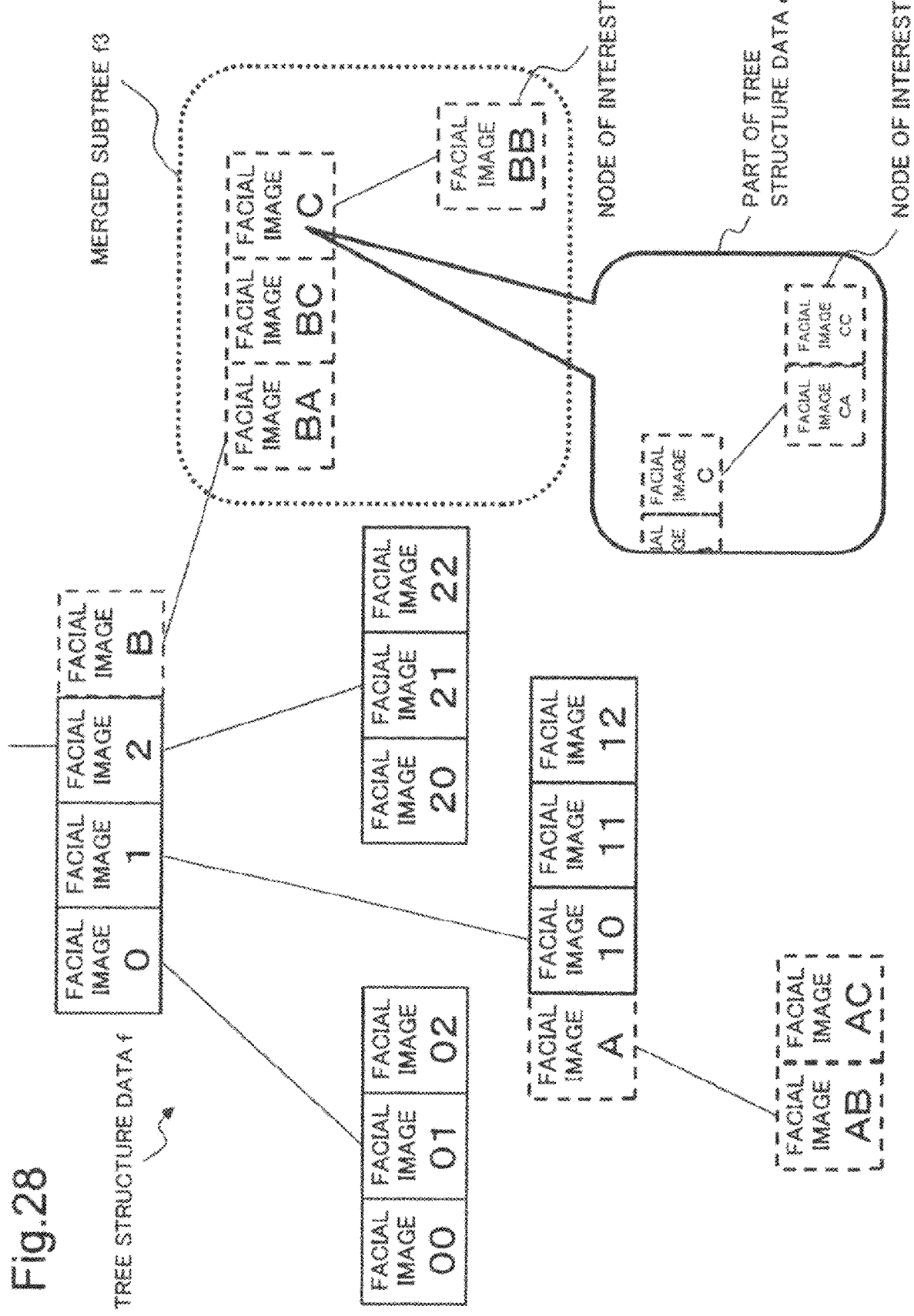
FIG. 28 is a diagram illustrating next nodes of interest in the specific example of the third example embodiment of the present invention.

In this case, one of the nodes of interest is the child node of the facial image B in the tree structure data f. Accordingly, the reorganization unit 203 inserts the merged subtree f3 illustrated in FIG. 27 into a position of a child node of the facial image B in the tree structure data f. Consequently, the tree structure data f becomes as illustrated in FIG. 28.

There is no facial image including a child node in the tree structure data e out of the facial image BA, the facial image BB, and the facial image BC being pieces of second information in the merged subtree f3. Accordingly, the restoration unit 204 does not restore a subtree including a child node and below in the merged subtree f3 with respect to the pieces of second information (Step S26).

Further, the facial image C being first information in the merged subtree f3 does not include a grandchild node and below. Accordingly, the adjustment unit 306 does not make an adjustment in the merged subtree f3 (Step S31).

Next, the selection unit 305 determines that a child node is connected to the facial image C being first information in the merged subtree f3, in the tree structure data e originally including the facial image C (Yes in Step S27).

Accordingly, the selection unit 305 selects the child node of the facial image C being first information in the merged subtree f3 in FIG. 28 as one of next nodes of interest. The node includes the facial image BB. Further, the selection unit 305 selects the child node of the facial image C in the tree structure data e originally including the facial image C as the other next node of interest. The node includes the facial image CA, the facial image CB, and the facial image CC. However, out of the facial images, the facial image CB is in the save area, and therefore the node includes the facial image CA and the facial image CC (Step S28).

Next, the information processing device 30 repeats the operation from Step S24 on the new nodes of interest selected in Step S28.

In this case, first, the reorganization unit 203 generates a new merged subtree f4 with respect to the facial image BB, the facial image CA, and the facial image CC included in the nodes of interest, based on a degree of similarity between the facial images (Step S24).

Figure 29:
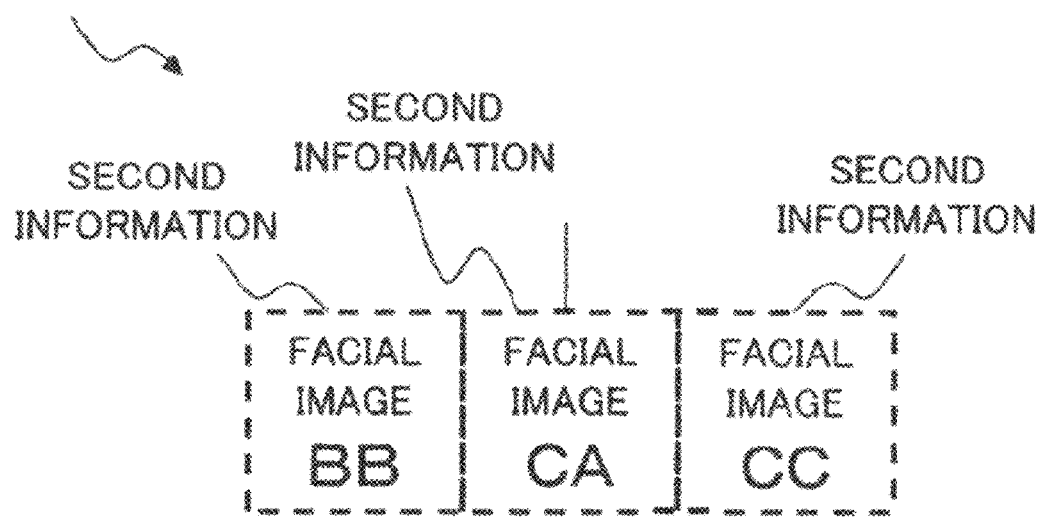
FIG. 29 is a diagram illustrating a merged subtree to be generated next in the specific example of the third example embodiment of the present invention.

Specifically, the reorganization unit 203 inserts the plurality of facial images into the merged subtree f4 in a random order, similarly to the previous operation. Then, it is assumed that the merged subtree f4 illustrated in FIG. 29 is generated. In FIG. 29, every one of the facial image BB, the facial image CA, and the facial image CC is arranged in the root node of the merged subtree f4. Further, in the merged subtree f4, there is no first information including a child node, and each of the facial image BB, the facial image CA, and the facial image CC is second information not including a child node.

Next, the reorganization unit 203 inserts the merged subtree f4 illustrated in FIG. 29 into a position based on the node of interest in the tree structure data f (Step S25).

Figure 30:
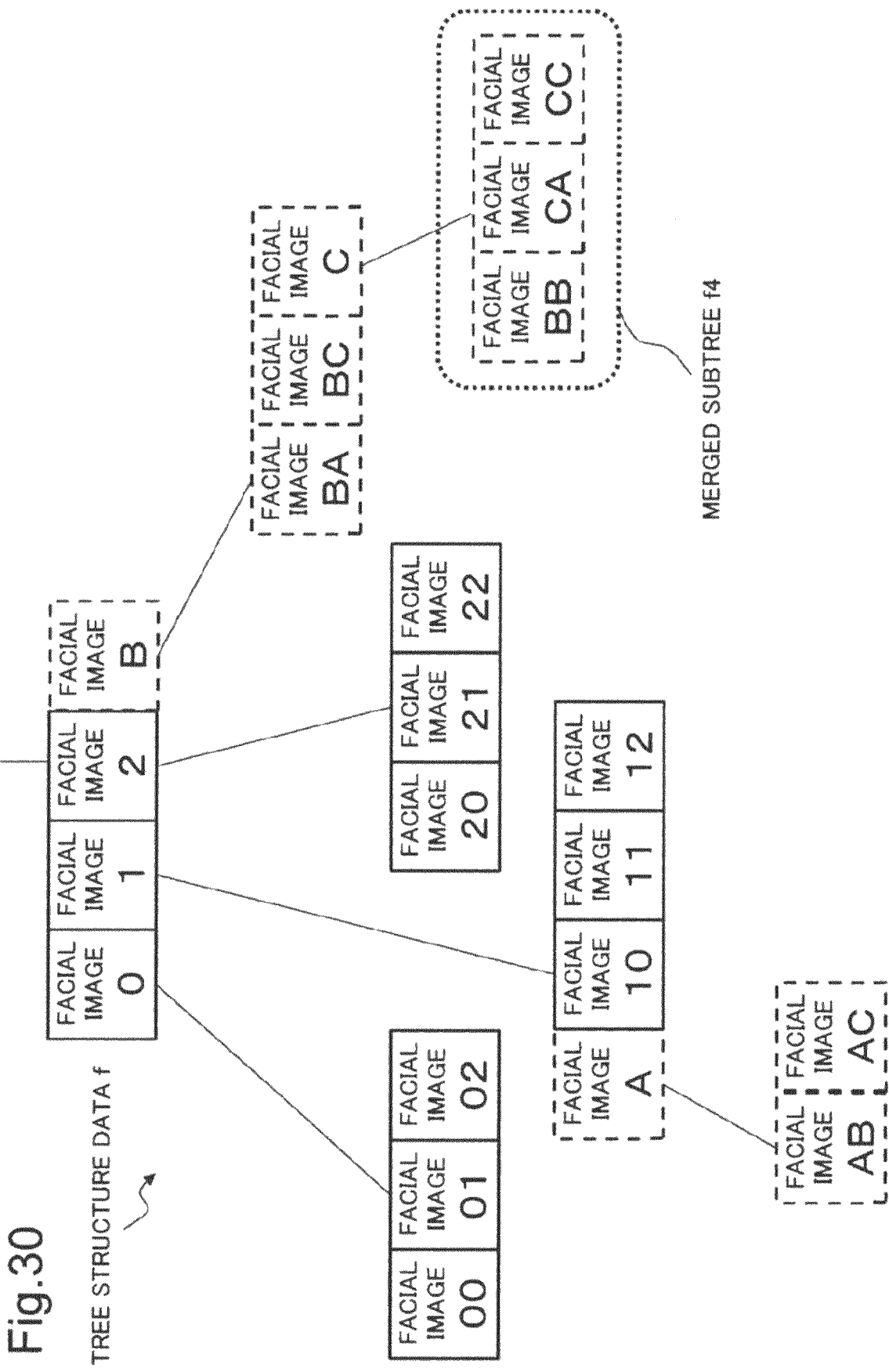
FIG. 30 is a diagram illustrating merged tree structure data into which a merged subtree is inserted in the specific example of the third example embodiment of the present invention.

In this case, one of the nodes of interest is the child node of the facial image C in the tree structure data f. Accordingly, the reorganization unit 203 inserts the merged subtree f4 illustrated in FIG. 29 into a position of a child node of the facial image C in the tree structure data f. Consequently, the tree structure data f becomes as illustrated in FIG. 30.

In this case, there is no facial image including a child node in the tree structure data e out of the facial image BB, the facial image CA, and the facial image CC being the pieces of second information in the merged subtree f4. Accordingly, the restoration unit 204 does not restore a subtree including a child node and below with respect to these pieces of second information (Step S26).

Further, the merged subtree f4 does not include first information, and therefore the adjustment unit 306 does not make an adjustment in the merged subtree f4 (Step S31).

Then, since the merged subtree f4 does not include first information (No in Step S27), the processing transitions to next Step S32.

In this case, the node in the tree structure data e including the facial image CB saved in the save area has been already selected as a node of interest. However, the node in the tree structure data e including the facial image AA saved in the save area has never been selected as a node of interest (Yes in Step S32).

Figure 31:
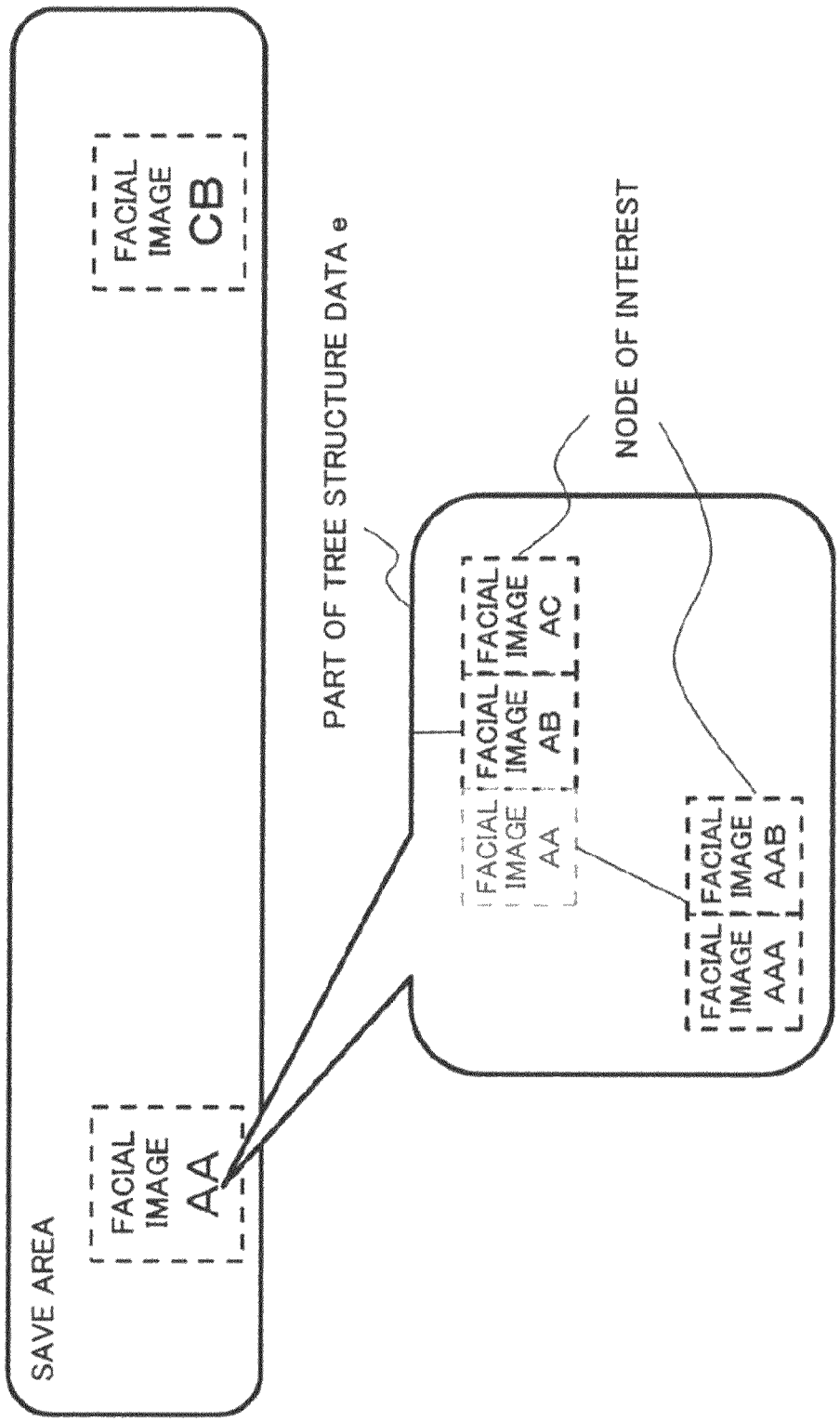
FIG. 31 is a diagram illustrating next nodes of interest in the specific example of the third example embodiment of the present invention.

Accordingly, as illustrated in FIG. 31, the selection unit 305 selects the node including the saved facial image AA in the tree structure data e and a node below the node as new nodes of interest. The nodes include the facial image AB, the facial image AC, the facial image AAA, and the facial image AAB excluding the saved facial image AA (Step S33).

Next, the information processing device 30 repeats the operation from Step S24 on the new nodes of interest selected in Step S33.

Specifically, the reorganization unit 203 generates a new merged subtree f5 with respect to the facial image AB, the facial image AC, the facial image AAA, and the facial image AAB included in the nodes of interest, based on a degree of similarity between the facial images (Step S24).

Specifically, the reorganization unit 203 inserts the plurality of facial images into the merged subtree f5 in a random order, similarly to the previous operation. Then, the merged subtree f5 illustrated in FIG. 32 is generated.

Figure 32:
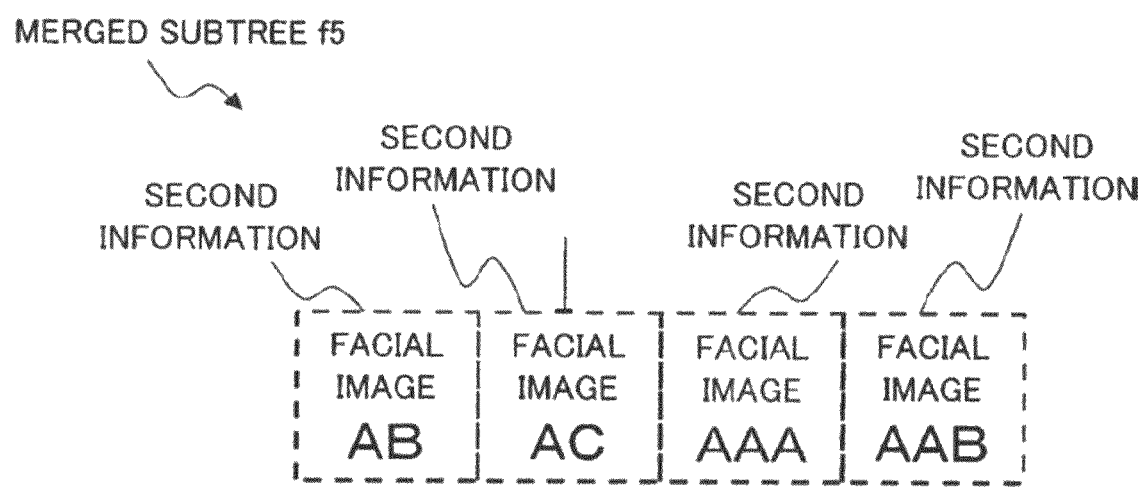
FIG. 32 is a diagram illustrating a merged subtree to be generated next in the specific example of the third example embodiment of the present invention.

In FIG. 32, every one of the facial image AB, the facial image AC, the facial image AAA, and the facial image AAB is arranged in the root node of the merged subtree f5. Further, there is no first information including a child node in the merged subtree f5, and each of the facial image AB, the facial image AC, the facial image AAA, and the facial image AAB is second information not including a child node.

Next, the reorganization unit 203 inserts the merged subtree f5 illustrated in FIG. 32 into a position based on the node of interest in the tree structure data f (Step S25).

Figure 33:
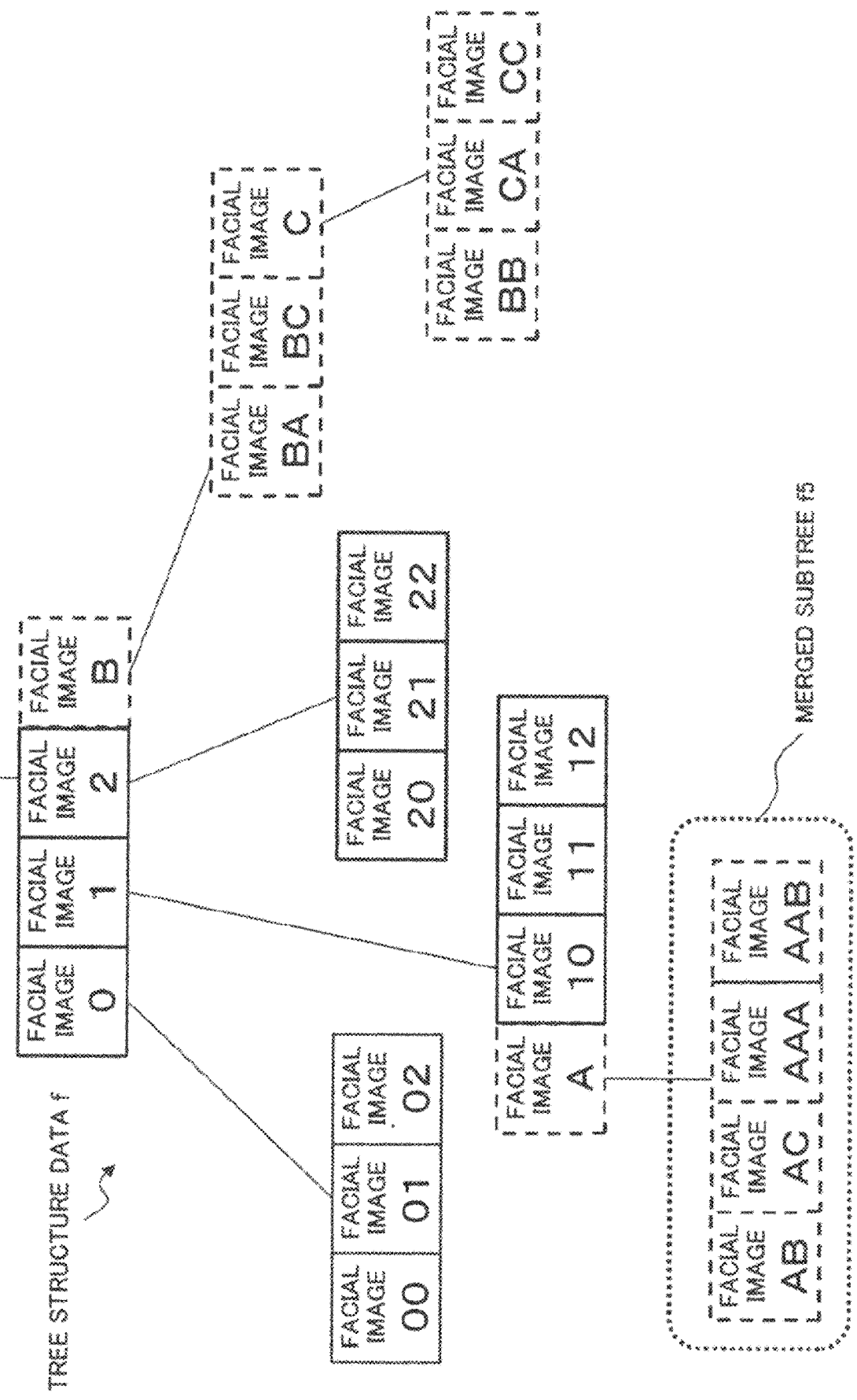
FIG. 33 is a diagram illustrating merged tree structure data into which a merged subtree is inserted in the specific example of the third example embodiment of the present invention.

In this case, the node of interest is the child node of the facial image A in the tree structure data e. Accordingly, the reorganization unit 203 inserts the merged subtree f5 illustrated in FIG. 32 into a position of a child node of the facial image A in the tree structure data f. Consequently, the tree structure data f becomes as illustrated in FIG. 33.

In this case, there is no facial image including a child node in the tree structure data e out of the facial image AB, the facial image AC, the facial image AAA, and the facial image AAB being pieces of second information in the merged subtree f5. Accordingly, the restoration unit 204 does not restore a subtree including a child node and below with respect to these pieces of second information (Step S26).

Further, the merged subtree f5 does not include first information, and therefore the adjustment unit 306 does not make an adjustment in the merged subtree f5 (Step S31).

Then, as described above, the merged subtree f5 does not include first information (No in Step S27).

Furthermore, a node that has never been selected as a node of interest no longer exists out of the nodes including the facial image saved in the save area in the tree structure data (No in Step S32).

Next, the adjustment unit 306 executes Step S34.

Specifically, the adjustment unit 306 inserts each of the facial image AA and the facial image CB saved in the save area into the tree structure data f illustrated in FIG. 33.

It is assumed that the facial image AA has the highest degree of similarity with the facial image 0 in the root node, and the degree of similarity satisfies a criterion for being included in a child node of the facial image 0 or below. It is further assumed that the facial image AA has the highest degree of similarity with the facial image 01 in the child node of the facial image 0, and the degree of similarity satisfies a criterion for being included in a child node of the facial image 01 or below. Further, the facial image 01 does not include a child node.

Then, the adjustment unit 306 newly connects a child node to the facial image 01 and arranges the facial image AA in the node (Step S32).

Furthermore, it is assumed that the facial image CB has the highest degree of similarity with the facial image 2 in the root node, and the degree of similarity satisfies a criterion for being included in a child node of the facial image 2 or below. Additionally, it is assumed that the facial image CB has the highest degree of similarity with the facial image 22 in the child node of the facial image 2, and the degree of similarity satisfies a criterion for being included in a child node of the facial image 22 or below. Further, the facial image 22 does not include a child node.

Then, the adjustment unit 306 newly connects a child node to the facial image 22 and arranges the facial image CB in the node (Step S32).

Figure 34:
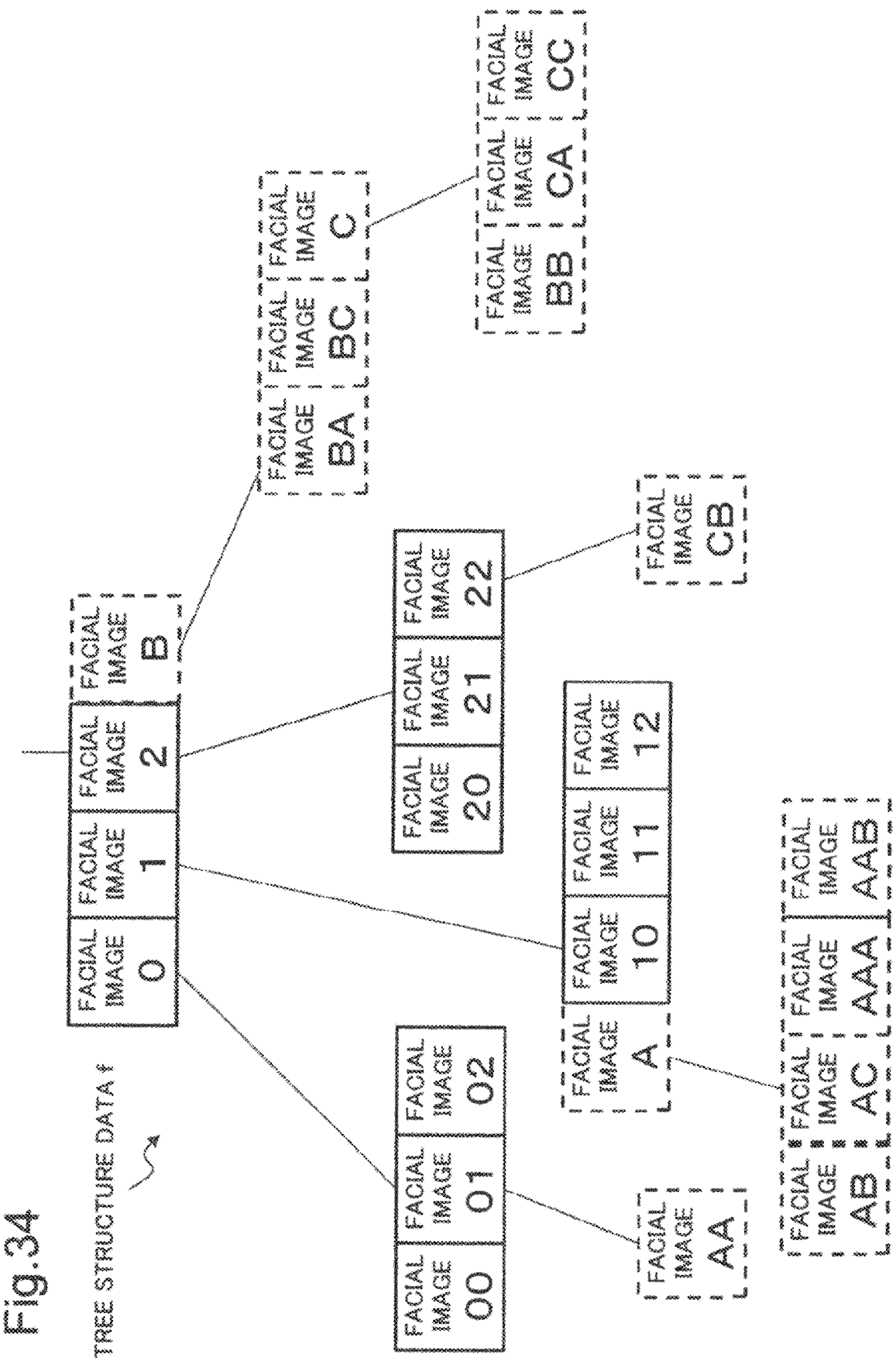
FIG. 34 is a diagram illustrating merged tree structure data into which saved information is inserted in the specific example of the third example embodiment of the present invention.

Consequently, the tree structure data f becomes as illustrated in FIG. 34.

This is the end of the description of the specific example.

Next, an effect of the third example embodiment of the present invention will be described.

The information processing device 30 according to the present example embodiment can more efficiently and more accurately merge a plurality of tree structures representing information groups, based on an evaluation result of an evaluation function evaluating a distance between pieces of information, into one tree structure.

The reason will be described. In addition to a configuration similar to that according the second example embodiment of the present invention, the present example embodiment includes a configuration as follows.

Specifically, the adjustment unit 306 adjusts a merged subtree such that a distance between first information in the merged subtree and each information included in a grandchild node of the first information and below is less than a criterion value for being included in the child node of the first information or below.

For example, out of pieces of information included in a grandchild node of the first information and below in the merged subtree, the adjustment unit 306 deletes, from the merged subtree, information a distance from which to the first information is greater than a criterion value for being included in the child node of the first information or below. Then, the adjustment unit 306 inserts the deleted information into merged tree structure data after repetition processing is completed.

Thus, the present example embodiment seeks improved efficiency by eliminating the need for reorganization processing of a tree structure between pieces of second information not including a child node and below in a merged subtree, similarly to the second example embodiment of the present invention.

Further, with respect to first information including a child node in a merged subtree and below, and information included in the child node of the first information and below, the present example embodiment accurately merges tree structure data by recursively performing generation processing of a merged subtree, similarly to the second example embodiment of the present invention.

It is confirmed that an evaluation between first information and information included in the child node of the first information in a merged subtree is high at reorganization. However, it is not confirmed whether or not an evaluation between first information and information included in a grandchild node and below restored after reorganization is high.

Accordingly, the present example embodiment excludes information an evaluation of which with first information does not satisfy a criterion for being included in the child node of the first information or below, from pieces of information included in a grandchild node of the first information and below, in a merged subtree. Consequently, a case that information not satisfying the criterion is included in a child node of certain information or below in a reorganized part is eliminated in merged tree structure data.

Then, the present example embodiment inserts the excluded information into a suitable position after recursive processing for generating merged tree structure data is completed. Consequently, the present example embodiment improves accuracy of a structure of merged tree structure data while improving efficiency of processing.

For example, in the specific example described above, the facial image AA is arranged in the grandchild node of the facial image 1 at the point of being restored in the merged subtree f1. However, the present example embodiment detects that the facial image AA does not satisfy the criterion for being included in a child node of the facial image 1 or below and temporarily deletes the facial image AA from the merged tree structure data.

Consequently, the facial image AA is eventually inserted into the child node of the facial image 01 being a child node of the facial image 0, and accuracy of the structure of the merged tree structure data is improved.

Further, in the specific example described above, the facial image CB is arranged in the grandchild node of the facial image B at the point of being restored in the merged subtree f1. However, the present example embodiment detects that the facial image CB does not satisfy the criterion for being included in a child node of the facial image B or below and temporarily deletes the facial image CB from the merged tree structure data.

Consequently, the facial image CB is eventually inserted into the child node of the facial image 22 being a child node of the facial image 2, and accuracy of the structure of the merged tree structure data is improved.

Thus, the present example embodiment improves accuracy of the structure of the merged tree structure data while improving efficiency of processing.

Fourth Example Embodiment

Next, a fourth example embodiment of the present invention will be described in detail with reference to drawings. In each drawing referred to in the description of the present example embodiment, a configuration identical to and a step operating similarly to those according to the second example embodiment of the present invention are respectively given reference signs identical to those in the second example embodiment, and detailed description thereof in the present example embodiment is omitted.

Figure 35:
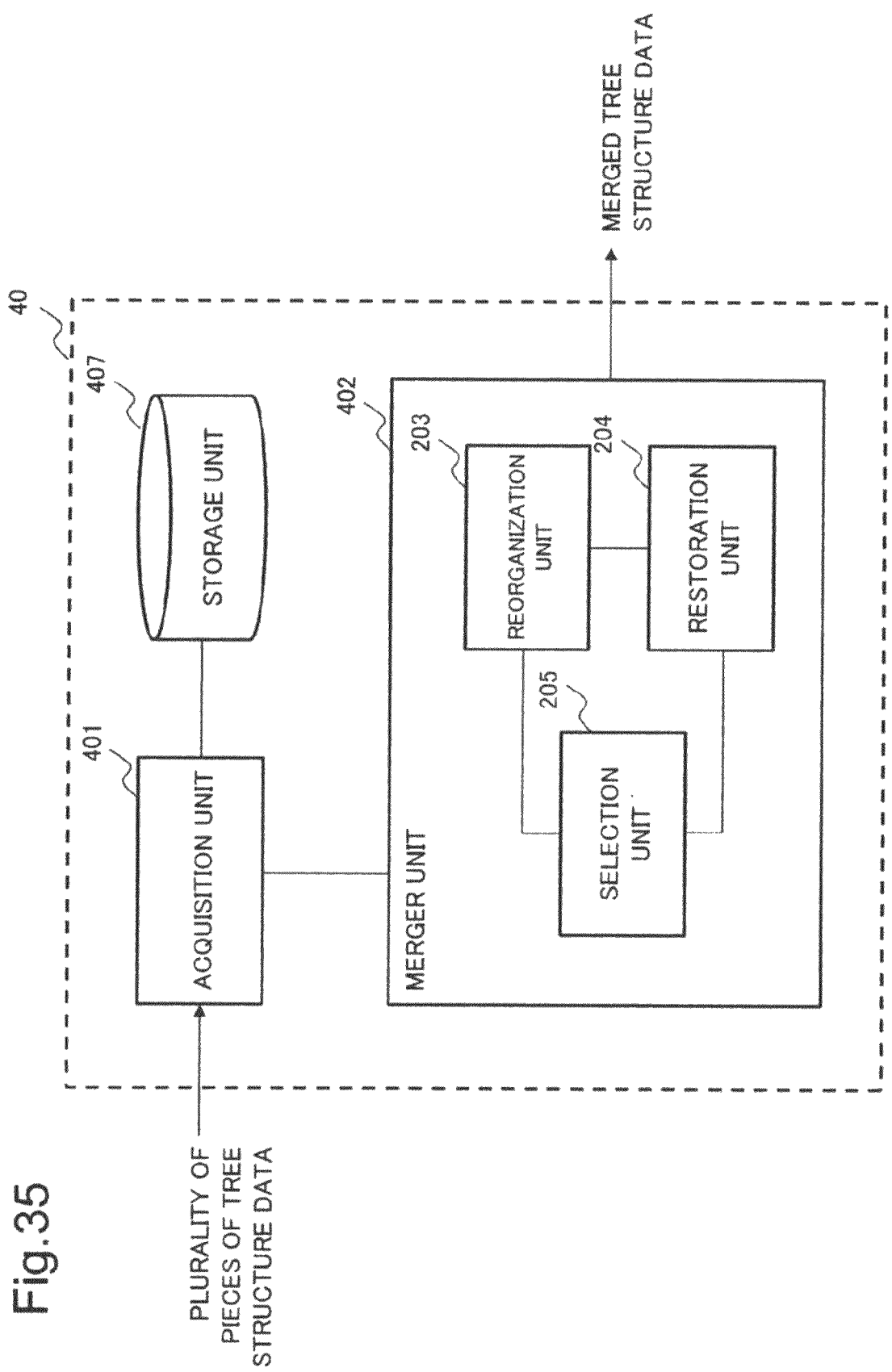
FIG. 35 is a diagram illustrating a functional block configuration of an information processing device according to a fourth example embodiment of the present invention.

First, FIG. 35 illustrates a functional block configuration of an information processing device 40 according to the fourth example embodiment of the present invention. In FIG. 35, the information processing device 40 differs from the information processing device 20 according to the second example embodiment of the present invention in including an acquisition unit 401 in place of the acquisition unit 101 and a merger unit 402 in place of the merger unit 202, and further including a storage unit 407.

The information processing device 40 and the respective functional blocks thereof can be configured with hardware components similar to those according to the first example embodiment of the present invention described with reference to FIG. 2. However, the hardware configuration of the information processing device 40 and the respective functional blocks thereof is not limited to the configuration described above.

The storage unit 407 stores tree structure data constructed for each range of time or space in which target information is acquired.

For example, the storage unit 407 may store tree structure data constructed in accordance with the rules 1 to 4 described in the second example embodiment of the present invention, with respect to information acquired on a daily basis. Further, for example, the storage unit 407 may store tree structure data constructed in accordance with the aforementioned rules 1 to 4, with respect to information acquired on a per business location basis.

The acquisition unit 401 acquires information indicating a designated range of time or space as an input. Then, the acquisition unit 401 acquires, from the storage unit 407, a plurality of tree structure data constructed for a range including a part overlapping the designated range of time or space.

For example, it is assumed that the acquisition unit 401 acquires information indicating a range of time being latest seven days as an input. In this case, the acquisition unit 401 may acquire seven tree structure data constructed on a daily basis, with respect to the latest seven days.

Further, for example, it is assumed that the acquisition unit 401 acquires information indicating a range of space being a certain region as an input. In this case, the acquisition unit 401 may acquire tree structure data constructed for respective business locations included in the certain region.

The merger unit 402 generates merged tree structure data with respect to an information group in a designated range of time or space.

In this case, the storage unit 407 does not necessarily store a plurality of tree structure data constituting an exact range with respect to the designated range of time or space. For example, it is assumed that the storage unit 407 stores tree structure data constructed for an information group acquired on a daily basis.

It is assumed that information designating a range of time being "from noon yesterday to noon today" is acquired by the acquisition unit 401. In this case, the acquisition unit 401 acquires tree structure data for yesterday and tree structure data for today constructed for a range including a part overlapping "from noon yesterday to noon today" being the designated range.

In consideration of such a case, the merger unit 402 is configured to operate similarly to the second example embodiment of the present invention after excluding information not included in a designated range of time or space out of pieces of information included in an acquired plurality of tree structure data.

The merger unit 402 may perform such processing of excluding information being out of a designated range of time or space before starting a merger operation or when causing a reorganization unit 203 and a restoration unit 204 to operate. Alternatively, the merger unit 402 may perform such processing of excluding information being out of a designated range of time or space after ending the merger operation.

Figure 36:
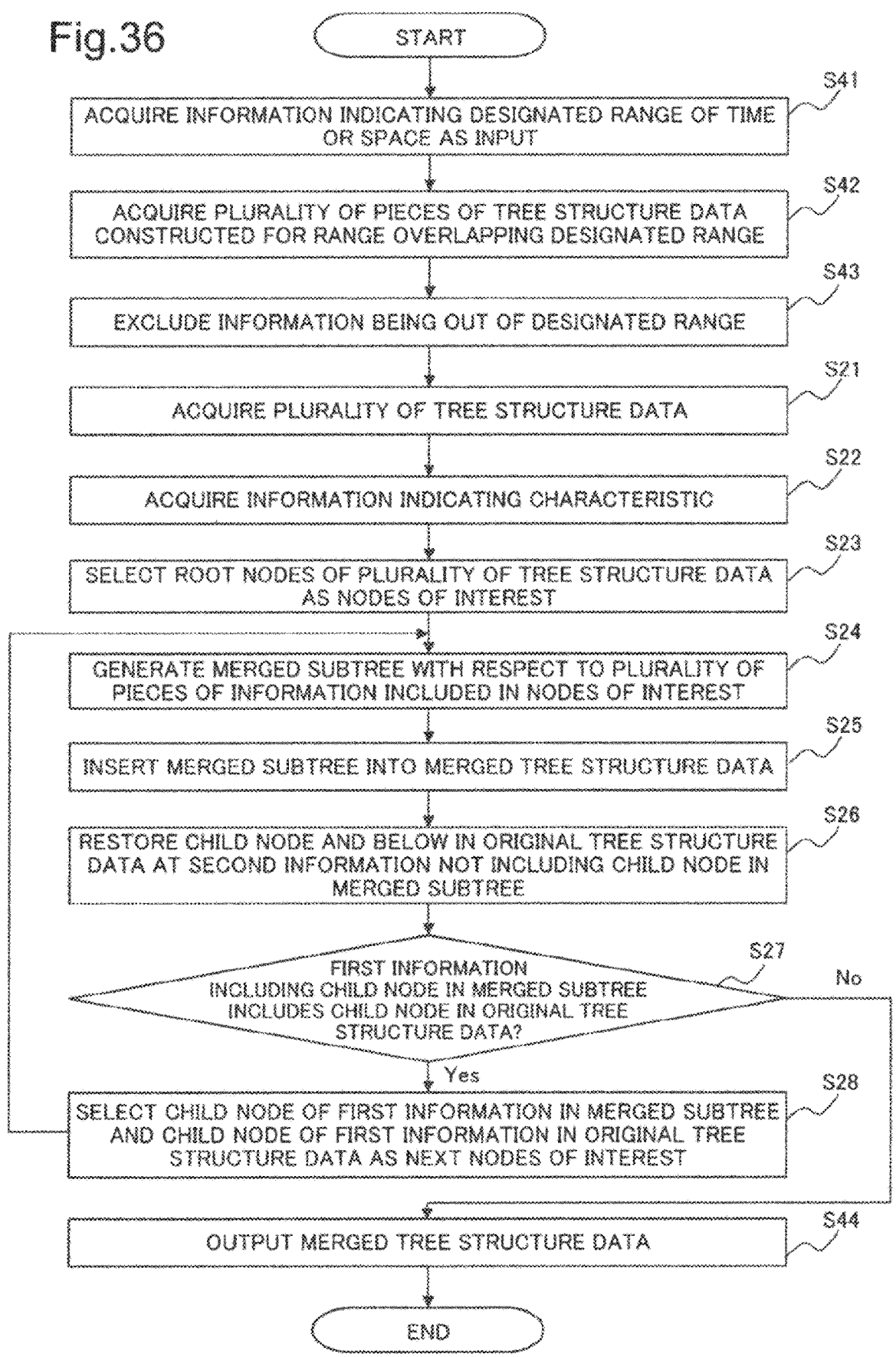
FIG. 36 is a flowchart illustrating an operation of the information processing device according to the fourth example embodiment of the present invention.

FIG. 36 illustrates an operation of the information processing device 40 configured as described above. In this case, it is assumed that the processing of excluding information being out of a designated range of time or space is performed before starting the merger operation.

In FIG. 36, first, the acquisition unit 401 acquires information indicating a designated range of time or space as an input (Step S41).

Next, the acquisition unit 401 acquires, from the storage unit 407, a plurality of tree structure data constructed for a range including a part overlapping the designated range of time or space (Step S42).

Next, when information being out of the designated range of time or space exists in pieces of information included in the acquired plurality of tree structure data, the merger unit 402 excludes the information (Step S43).

Thereafter, the information processing device 40 executes Steps S21 to S28, similarly to the second example embodiment of the present invention.

Then, the merger unit 402 outputs merged tree structure data as tree structure data in the designated range of time or space (Step S44).

Then, the information processing device 40 ends the operation.

Next, an effect of the fourth example embodiment of the present invention will be described.

The information processing device 40 according to the fourth example embodiment of the present invention can efficiently and accurately generate tree structure data for a designated range of time or space.

The reason will be described below.

In addition to a configuration similar to that according to the second example embodiment of the present invention, the present example embodiment includes a configuration as follows. Specifically, the storage unit 407 stores tree structure data constructed for each range of time or space in which target information is acquired. Then, the acquisition unit 401 acquires, from the storage unit 407, a plurality of tree structure data constructed for a range including a part overlapping the designated range of time or space. Then, by merging the acquired plurality of tree structure data, the merger unit 402 generates merged tree structure data for the designated range of time or space.

The present example embodiment particularly improves processing efficiency when a range of time or space of a required information group is small compared with a total amount of acquired information groups.

While an example of information included in tree structure data being a facial image or a sentence has been described, according to the respective example embodiments of the present invention described above, a type of information included in tree structure data is not limited to the above.

Further, an example of an output of an evaluation function evaluating a distance between pieces of information being a numerical value indicating a degree of similarity has been described, according to the respective example embodiments of the present invention described above. However, an output of an evaluation function evaluating a distance between pieces of information is not limited to a degree of similarity.

Further, an example of a number of tree structure data to be merged being two has been mainly described, according to the respective example embodiments of the present invention described above. However, the respective example embodiments provide a similar effect by a similar operation when merging three tree structure data or more.

Further, an example of the respective functional blocks of the information processing devices 10 to 40 being provided by a CPU executing a computer program stored in a memory has been mainly described, according to the respective example embodiments of the present invention described above. Without being limited to the above, the respective functional blocks may be provided in part, in whole, or in combination by dedicated hardware.

Further, the functional blocks of the information processing devices 10 to 40 may be provided by a plurality of devices in a distributed manner, according to the respective example embodiments of the present invention described above.

Further, each of the operations of the information processing devices 10 to 40 described with reference to the respective flowcharts may be stored in a storage device (storage medium) in a computer device as a computer program according to the present invention, according to the respective example embodiments of the present invention described above. Then, a relevant CPU may read and execute such a computer program. In such a case, the present invention is configured with a code of such a computer program or storage medium.

Further, the respective example embodiments described above can be suitably implemented in combination.

Further, without being limited to the respective example embodiments described above, the present invention can be implemented in various modes.

Example of Mode of Present Invention

The example embodiments of the present invention may be described in whole or in part as the following supplementary notes. However, the present invention is not limited to the following supplementary notes.

(Supplementary Note 1)

An information processing device comprising:

acquisition means for acquiring a plurality of tree structure data in which information groups are represented by tree structures based on a distance between pieces of information, each of the plurality of tree structure data being configured such that a distance between pieces of information included in a child node connected to a parent node is shorter than a distance between pieces of information included in the parent node, and also a distance between pieces of information included in a node becomes shorter as the node gets closer to an end node of the tree structure; and merge means for generating merged tree structure data merging the plurality of tree structure data acquired, wherein the merge means is configured to perform:

for information satisfying a condition indicating that a certain distance from other information in the tree structure data is maintained, merging a subtree at a level below the information in the tree structure data, into the merged tree structure data, wherein the information satisfying the condition is included in a node selected from the plurality of pieces of tree structure data; and including, among the plurality of pieces of information, with respect to information satisfying a condition indicating that the distance between pieces of information is short, a merged subtree by merging subtrees below the information in the tree structure data into the information.

(Supplementary Note 2)

The information processing device according to supplementary note 1, wherein the merger means includes:

reorganization means for generating the merged subtree, the merged subtree merging information included in each of a plurality of nodes of interest and reorganizing the information to be represented by the tree structure, and inserting the generated merged subtree into a position based on the node of interest in the merged tree structure data;

restoration means for, when information including a child node in the merged subtree is referred to as first information and information not including a child node in the merged subtree is referred to as second information, connecting a child node and below to the second information, the child node and below connected to the second information in the tree structure data including the second information; and selection means for, after selecting root nodes of, each of the plurality of tree structure data as the nodes of interest and causing the reorganization means and the restoration means to function, selecting, as new nodes of interest, a child node connected to the first information in the merged subtree and a child node connected to the first information in the tree structure data including the first information, and causing the reorganization means and the restoration means to function repeatedlly.

(Supplementary Note 3)

The information processing device according to supplementary note 1 or 2, wherein the merger means further includes adjustment means for adjusting the merged subtree such that a distance between the first information in the merged subtree and each information included in a grandchild node of the first information and below is less than a criterion value for the each piece of information being included in the child node of the first information or below.

(Supplementary Note 4)

The information processing device according to supplementary note 3, wherein the adjustment means deletes, from the merged subtree, information a distance from which to the first information is greater than the criterion value out of one or more pieces of information included in a grandchild node of the first information and below in the merged subtree, and inserts the deleted information into the merged tree structure data the repetition processing on which by the selection means is completed.

(Supplementary Note 5)

The information processing device according to any one of supplementary notes 1 to 4, further comprising:

storage means for storing the tree structure data constructed for each range of time or space in which target information is acquired, wherein the acquisition means acquires, from the storage means, the plurality of tree structure data constructed for each range including a part overlapping a designated range of time or space, and the merger means generates the merged tree structure data for a designated range of time or space by merging, each of the plurality of tree structure data.

(Supplementary Note 6)

A method comprising, by a computer device:

acquiring a plurality of tree structure data in which information groups are represented by tree structures based on a distance between pieces of information, each of the plurality of tree structure data being configured such that a distance between pieces of information included in a child node connected to a parent node is shorter than a distance between pieces of information included in the parent node, and also a distance between pieces of information included in a node becomes shorter as the node gets closer to an end node of the tree structure; and generating merged tree structure data merging the plurality of tree structure data acquired, wherein the generating the merged tree structure data comprises:

for information satisfying a condition indicating that a certain distance from other information in the tree structure data is maintained, merging a subtree at a level below the information in the tree structure data, into the merged tree structure data, wherein the information satisfying the condition is included in a node selected from the plurality of pieces of tree structure data; and including, among the plurality of pieces of information, with respect to information satisfying a condition indicating that the distance between pieces of information is short, a merged subtree by merging subtrees below the information in the tree structure data into the information.

(Supplementary Note 7)

The method according to supplementary note 6, further comprising:

when the computer device performs the merger, selecting root nodes of the plurality of tree structure data as nodes of interest;

generating a merged subtree reorganizing a plurality of pieces of information including information included in each of the nodes of interest such that the plurality of pieces of information are represented by the tree structure; and inserting the generated merged subtree into a position based on the node of interest in the merged tree structure data;

when information including a child node in the merged subtree is referred to as first information and information not including a child node is referred to as second information, connecting a child node and below connected to the second information in the tree structure data including the second information;

selecting, as new nodes of interest, a child node connected to the first information in the merged subtree and a child node connected to the first information in the tree structure data including the first information; and repeating the reorganization and the insertion of the new merged subtree, and restoration of the child node.

(Supplementary Note 8)

The method according to supplementary note 6 or 7, further comprising, when the computer device performs the merger, adjusting the merged subtree such that a distance between the first information in the merged subtree and each information included in a grandchild node of the first information and below is less than a criterion value for being included in the child node of the first information or below.

(Supplementary Note 9)

The method according to supplementary note 8, further comprising, when adjusting the merged subtree, deleting, from the merged subtree, information a distance from which to the first information is greater than the criterion value out of one or more pieces of information included in a grandchild node of the first information and below in the merged subtree; and inserting deleted information into the merged tree structure data the repetition processing on which by the selection means is completed.

(Supplementary Note 10)

The method according to any one of supplementary notes 6 to 9, further comprising:

storing, in storage means, the tree structure data constructed for each range of time or space in which target information is acquired;

acquiring, from the storage means, the plurality of tree structure data constructed for each range including a part overlapping a designated range of time or space; and, when the computer device performs the merger, generating the merged tree structure data for a designated range of time or space by merging, each of the plurality of tree structure data.

(Supplementary Note 11)

A program recording medium having a program recorded thereon, the program causing a computer device to execute:

acquiring a plurality of tree structure data in which information groups are represented by tree structures based on a distance between pieces of information, the plurality of tree structure data being configured such that a distance between pieces of information included in a child node connected to information included in a parent node is shorter than a distance between pieces of information included in the parent node, and also a distance between pieces of information included in a node becomes shorter as the node gets closer to an end node of the tree structure; and, in order to generate merged tree structure data merging the plurality of tree structure data, with respect to each piece of information satisfying a condition indicating that a certain distance from each piece of other information is maintained in a plurality of pieces of information including information included in a node selected in each of the plurality of tree structure data, including, merging a subtree at a level below the information in the tree structure data into the information, into the merged tree structure data, and, with respect to a plurality of pieces of information mutually satisfying a condition indicating that the distance between pieces of information is short, including a subtree reorganizing a subtree below each piece of information in the tree structure data into the information such that the subtree is merged into the merged tree structure data.

(Supplementary Note 12)

The program recording medium according to supplementary note 11 having the program recorded thereon, the program causing the computer device to further execute:

selecting root nodes of the plurality of tree structure data as the nodes of interest;

generating a merged subtree reorganizing a plurality of pieces of information including information included in each of the nodes of interest such that the plurality of pieces of information are represented by the tree structure;

inserting a generated merged subtree into a position based on the node of interest in the merged tree structure data;

when information including a child node in the merged subtree is referred to as first information and information not including a child node is referred to as second information, restoring a child node and below connected to the second information in the tree structure data including the second information by connecting the child node and below to the second information; and repeating selecting, as new nodes of interest, a child node connected to the first information in the merged subtree and a child node connected to the first information in original the tree structure data including the first information.

(Supplementary Note 13)

The program recording medium according to supplementary note 11 or 12 having the program recorded thereon, the program causing the computer device to further execute:

adjusting the merged subtree such that a distance between the first information in the merged subtree and each information included in a grandchild node of the first information and below is less than a criterion value for being included in the child node of the first information or below.

(Supplementary Note 14)

The program recording medium according to supplementary note 13 having the program recorded thereon, the program causing the computer device to further execute:

deleting, from the merged subtree, information a distance from which to the first information is greater than the criterion value out of one or more pieces of information included in a grandchild node of the first information and below in the merged subtree; and inserting deleted information into the merged tree structure data the repetition processing on which is completed.

(Supplementary Note 15)

The program recording medium according to any one of supplementary notes 11 to 14 having the program recorded thereon, the program causing the computer device to further execute:

storing, in storage means, the tree structure data constructed for each range of time or space in which target information is acquired;

acquiring, from the storage means, the plurality of tree structure data constructed for each range including a part overlapping a designated range of time or space; and generating the merged tree structure data for a designated range of time or space by merging, each of the plurality of tree structure data.

The present invention has been described above with the example embodiments described above as exemplary examples. However, the present invention is not limited to the example embodiments described above. In other words, various modes that may be understood by a person skilled in the art may be applied to the present invention, within the scope of the present invention.

REFERENCE SIGNS LIST 10, 20, 30, 40 Information processing device
101, 401 Acquisition unit
102, 202, 302, 402 Merger unit
203 Reorganization unit
204 Restoration unit
205, 305 Selection unit
306 Adjustment unit
407 Storage unit
1001 CPU
1002 Memory
1003 Output device
1004 Input device

What is claimed is:

1. An information processing device comprising:
at least one memory storing computer-programs; and
at least one processor executing the computer-programs to perform:
acquiring a plurality of tree structure data in which information groups are represented by tree structures based on a distance between pieces of information, the plurality of tree structure data including first tree structure data and second tree structure data, and each of the plurality of tree structure data being configured such that a distance between pieces of information included in a child node connected to a parent node is less than a distance between pieces of information included in the parent node, and also a distance between pieces of information included in a node decreases as the node gets closer to an end node of the tree structure; and
generating merged tree structure data merging the plurality of tree structure data acquired, wherein
the at least one processor is configured to perform:
for first information of the first tree structure data and second information of the second tree structure data satisfying a condition indicating that the distance between the first information and the second information has decreased, determining whether the second information and third information satisfy the condition indicating that the distance between the second information the third information has decreased, the third information being one or more child nodes connected to the first information in the first tree structure data; and
reorganizing the second information and the third information based on similarity between the second information and the third information to generate subtree structure data including the second information and the third information, the subtree structure data connected to the first information in the merged tree structure data.

2. The information processing device according to claim 1, wherein
the at least one processor is further configured to perform:
generating the merged subtree, the merged subtree merging information included in each of a plurality of nodes of interest and reorganizing the information to be represented by the tree structure, and inserting the generated merged subtree into a position based on the node of interest in the merged tree structure data;
when information including a child node in the merged subtree is referred to as fourth information and information not including a child node in the merged subtree is referred to as fifth information, connecting a child node and below to the fifth information, the child node and below connected to the fifth information in the tree structure data including the fifth information; and
after selecting root nodes of ,each of the plurality of tree structure data as the nodes of interest and the generation of the merged subtree and the connection of the child node and below to the fifth information, selecting, as new nodes of interest, a child node connected to the fourth information in the merged subtree and a child node connected to the fourth information in the tree structure data including the fourth information, and executing the generation of the merged subtree and the connection of the child node and below to the fifth information repeatedly.

3. The information processing device according to claim 1, wherein
the at least one processor is further configured to perform:
adjusting the merged subtree such that a distance between the fourth information in the merged subtree and each information included in a grandchild node of the fourth information and below is less than a criterion value for the each piece of information being included in the child node of the fourth information or below.

4. The information processing device according to claim 3, wherein
the at least one processor is further configured to perform:
deleting, from the merged subtree, information a distance from which to the fourth information is greater than the criterion value out of one or more pieces of information included in a grandchild node of the fourth information and below in the merged subtree, and inserts the deleted information into the merged tree structure data the repetition processing on which is completed.

5. The information processing device according to claim 1, further comprising:
a storage for storing the tree structure data constructed for each range of time or space in which target information is acquired, wherein
the at least one processor is further configured to perform:
acquiring, from the storage, the plurality of tree structure data constructed for each range including a part overlapping a designated range of time or space; and
generating the merged tree structure data for a designated range of time or space by merging each of the plurality of tree structure data.

6. A method comprising, by a computer device:
acquiring a plurality of tree structure data in which information groups are represented by tree structures based on a distance between pieces of information, the plurality of tree structure data including first tree structure data and second tree structure data, and each of the plurality of tree structure data being configured such that a distance between pieces of information included in a child node connected to a parent node is less than a distance between pieces of information included in the parent node, and also a distance between pieces of information included in a node decreases as the node gets closer to an end node of the tree structure; and
generating merged tree structure data merging the plurality of tree structure data acquired, wherein
the generating the merged tree structure data comprises:
for first information of the first tree structure data and second information of the second tree structure data satisfying a condition indicating that the distance between the first information and the second information has decreased, determining whether the second information and third information satisfy the condition indicating that the distance between the second information the third information has decreased, the third information being one or more child nodes connected to the first information in the first tree structure data; and reorganizing the second information and the third information based on similarity between the second information and the third information to generate subtree structure data including the second information and the third information, the subtree structure data connected to the first information in the merged tree structure data.

7. The method according to claim 6, further comprising: when the computer device performs the merger,
selecting root nodes of the plurality of tree structure data as nodes of interest;
generating a merged subtree reorganizing a plurality of pieces of information including information included in each of the nodes of interest such that the plurality of pieces of information are represented by the tree structure; and
inserting the generated merged subtree into a position based on the node of interest in the merged tree structure data;
when information including a child node in the merged subtree is referred to as fourth information and information not including a child node is referred to as fifth information,
connecting a child node and below connected to the fifth information in the tree structure data including the fifth information;
selecting, as new nodes of interest, a child node connected to the fourth information in the merged subtree and a child node connected to the fourth information in the tree structure data including the fourth information; and
repeating the reorganization and the insertion of the new merged subtree, and restoration of the child node.

8. The method according to claim 6, further comprising, when the computer device performs the merger,
adjusting the merged subtree such that a distance between the fourth information in the merged subtree and each information included in a grandchild node of the fourth information and below is less than a criterion value for being included in the child node of the fourth information or below.

9. The method according to claim 8, further comprising, when adjusting the merged subtree,
deleting, from the merged subtree, information a distance from which to the fourth information is greater than the criterion value out of one or more pieces of information included in a grandchild node of the fourth information and below in the merged subtree; and
inserting deleted information into the merged tree structure data the repetition processing on which is completed.

10. The method according to claim 6, further comprising:
storing, in a storage, the tree structure data constructed for each range of time or space in which target information is acquired;
acquiring, from the storage, the plurality of tree structure data constructed for each range including a part overlapping a designated range of time or space; and,
when the computer device performs the merger,
generating the merged tree structure data for a designated range of time or space by merging each of the plurality of tree structure data.

11. A non-transitory program recording medium having a program recorded thereon, the program causing a computer device to execute:
acquiring a plurality of tree structure data in which information groups are represented by tree structures based on a distance between pieces of information, the plurality of tree structure data including first tree structure data and second tree structure data, and the plurality of tree structure data being configured such that a distance between pieces of information included in a child node connected to information included in a parent node is less than a distance between pieces of information included in the parent node, and also a distance between pieces of information included in a node decreases as the node gets closer to an end node of the tree structure; and,
in order to generate merged tree structure data merging the plurality of tree structure data,
for first information of the first tree structure data and second information of the second tree structure data satisfying a condition indicating that the distance between the first information and the second information has decreased determining whether the second information and third information satisfy the condition indicating that the distance between the second information the third information has decreased, the third information being one or more child nodes connected to the first information in the first tree structure data, and,
reorganizing the second information and the third information based on similarity between the second information and the third information to generate subtree structure data including the second information and the third information, the subtree structure data connected to the first information in the merged tree structure data.

12. The non-transitory program recording medium according to claim 11 having the program recorded thereon, the program causing the computer device to further execute:
selecting root nodes of the plurality of tree structure data as the nodes of interest;
generating a merged subtree reorganizing a plurality of pieces of information including information included in each of the nodes of interest such that the plurality of pieces of information are represented by the tree structure;
inserting a generated merged subtree into a position based on the node of interest in the merged tree structure data;
when information including a child node in the merged subtree is referred to as fourth information and information not including a child node is referred to as fifth information, restoring a child node and below connected to the fifth information in the tree structure data including the fifth information by connecting the child node and below to the fifth information; and
repeating selecting, as new nodes of interest, a child node connected to the fourth information in the merged subtree and a child node connected to the fourth information in original the tree structure data including the fourth information.

13. The non-transitory program recording medium according to claim 11 having the program recorded thereon, the program causing the computer device to further execute:
adjusting the merged subtree such that a distance between the fourth information in the merged subtree and each information included in a grandchild node of the fourth information and below is less than a criterion value for being included in the child node of the fourth information or below.

14. The non-transitory program recording medium according to claim 13 having the program recorded thereon, the program causing the computer device to further execute:
   deleting, from the merged subtree, information a distance from which to the fourth information is greater than the criterion value out of one or more pieces of information included in a grandchild node of the fourth information and below in the merged subtree; and
   inserting deleted information into the merged tree structure data the repetition processing on which is completed.

15. The non-transitory program recording medium according to claims 11 having the program recorded thereon, the program causing the computer device to further execute:
   storing, in a storage, the tree structure data constructed for each range of time or space in which target information is acquired;
   acquiring, from the storage, the plurality of tree structure data constructed for each range including a part overlapping a designated range of time or space; and
   generating the merged tree structure data for a designated range of time or space by merging each of the plurality of tree structure data.

* * * * *